(12) United States Patent
Palumbo et al.

(10) Patent No.: US 10,109,867 B2
(45) Date of Patent: Oct. 23, 2018

(54) SOLID OXIDE FUEL CELL WITH FLEXIBLE FUEL ROD SUPPORT STRUCTURE

(71) Applicant: Upstart Power, Inc., Southborough, MA (US)

(72) Inventors: Nathan Palumbo, West Boylston, MA (US); Joshua Persky, Berlin, MA (US); Brendan Heinig, Berlin, MA (US); Peter F. Simpson, Wrentham, MA (US); William Pink, Ashland, MA (US)

(73) Assignee: Upstart Power, Inc., Southborough, MA (US)

( * ) Notice: Subject to any disclaimer, the term of this patent is extended or adjusted under 35 U.S.C. 154(b) by 683 days.

(21) Appl. No.: 13/927,418

(22) Filed: Jun. 26, 2013

(65) Prior Publication Data

US 2015/0004528 A1 Jan. 1, 2015

(51) Int. Cl.
*H01M 8/04* (2016.01)
*H01M 8/0252* (2016.01)
(Continued)

(52) U.S. Cl.
CPC .............. *H01M 8/0252* (2013.01); *F16L 5/00* (2013.01); *F16L 5/10* (2013.01); *H01M 8/0267* (2013.01);
(Continued)

(58) Field of Classification Search
CPC ...... H01M 8/04; H01M 8/12; H01M 8/04201; H01M 2008/1293; H01M 8/0252;
(Continued)

(56) References Cited

U.S. PATENT DOCUMENTS

| 547,504 A | * | 10/1895 | Scott | ......................... F16L 5/10 |
| | | | | 285/139.1 |
| 1,678,388 A | * | 7/1928 | Holden | ..................... F16L 5/00 |
| | | | | 126/317 |

(Continued)

FOREIGN PATENT DOCUMENTS

| EP | 1966850 A2 | 9/2008 |
| WO | 2007/076440 A2 | 7/2007 |
| WO | WO-2007/076440 A2 | 7/2007 |

OTHER PUBLICATIONS

International Search Report dated Nov. 5, 2014 in corresponiding PCT application PCT/US2014/042684.

(Continued)

*Primary Examiner* — Michael L Dignan
(74) *Attorney, Agent, or Firm* — Burns & Levinson LLP; George N. Chaclas; Richard B. Emmons

(57) ABSTRACT

A rod assembly and method for supporting rods includes opposing end plates for supporting opposing ends of a plurality of solid oxide fuel cell rods with each rod comprising a hollow gas conduit passing there through. Each rod end is supported by an annular flexure configured to provide a gas/liquid tight seal between the rod ends and the end plates. Each annular flexure includes a flexible portion surrounding the rod end such that forces imparted to either or both of the rod and the end plate act to elastically deform the annular flexure without damaging the rods. The rod assembly operates and a Solid Oxide Fuel Cell (SOFC) with operating temperatures of 500 to 1000° C.

22 Claims, 13 Drawing Sheets

(51) Int. Cl.
  *H01M 8/0273* (2016.01)
  *H01M 8/0267* (2016.01)
  *F16L 5/10* (2006.01)
  *F16L 5/00* (2006.01)
  *H01M 8/243* (2016.01)
  *H01M 8/2465* (2016.01)
  *H01M 8/0276* (2016.01)
  *H01M 8/1231* (2016.01)

(52) U.S. Cl.
  CPC ....... *H01M 8/0273* (2013.01); *H01M 8/0276* (2013.01); *H01M 8/1231* (2016.02); *H01M 8/243* (2013.01); *H01M 8/2465* (2013.01)

(58) Field of Classification Search
  CPC .. H01M 8/1231; H01M 8/243; H01M 8/0276; H01M 8/2465; H01M 8/0273; H01M 8/0267; F16L 3/04; F16L 59/121; F16L 5/00; F16L 5/02; F16L 5/10
  USPC .................................................. 429/508, 353
  See application file for complete search history.

(56) References Cited

U.S. PATENT DOCUMENTS

| | | | | |
|---|---|---|---|---|
| 3,162,411 | A * | 12/1964 | Duggan | F16L 5/10 16/2.2 |
| 3,372,960 | A * | 3/1968 | Fisher | F16C 23/04 174/153 G |
| 3,397,901 | A * | 8/1968 | Larrivee | F16L 5/00 248/151 |
| 3,654,382 | A * | 4/1972 | Rubright | F16B 9/02 16/2.2 |
| 4,103,901 | A * | 8/1978 | Ditcher | B28B 23/0043 277/606 |
| 4,216,930 | A * | 8/1980 | Rossler, Jr. | F16L 5/00 174/153 G |
| 4,387,900 | A * | 6/1983 | Ditcher | E03F 5/021 277/606 |
| 4,656,689 | A * | 4/1987 | Dennis | F16L 5/027 16/2.2 |
| 4,910,100 | A | 3/1990 | Nakanishi et al. | |
| 5,169,730 | A | 12/1992 | Reichner et al. | |
| 5,501,472 | A * | 3/1996 | Brancher | F16L 5/10 277/606 |
| 5,732,440 | A * | 3/1998 | Wright | H02G 3/083 16/2.2 |
| 5,733,675 | A | 3/1998 | Dederer et al. | |
| 5,750,278 | A | 5/1998 | Gillett et al. | |
| 5,827,620 | A | 10/1998 | Kendall | |
| 6,123,339 | A * | 9/2000 | Otsuji | F16J 15/04 277/602 |
| 6,221,522 | B1 | 4/2001 | Zafred et al. | |
| 6,265,092 | B1 | 7/2001 | Meltser et al. | |
| 6,306,531 | B1 | 10/2001 | Clingerman et al. | |
| 6,358,640 | B1 | 3/2002 | Kendall et al. | |
| 6,485,852 | B1 | 11/2002 | Miller et al. | |
| 6,492,050 | B1 | 12/2002 | Sammes | |
| 6,608,463 | B1 | 8/2003 | Kelly et al. | |
| 6,627,339 | B2 | 9/2003 | Haltiner, Jr. | |
| 6,696,187 | B2 | 2/2004 | Kendall et al. | |
| 6,841,284 | B2 | 1/2005 | Brown et al. | |
| 7,001,682 | B2 | 2/2006 | Haltiner, Jr. | |
| 7,008,711 | B2 | 3/2006 | Pondo et al. | |
| 7,014,822 | B1 | 3/2006 | Shinke et al. | |
| 7,335,432 | B2 | 2/2008 | Koripella | |
| 7,419,060 | B2 | 9/2008 | Arthur et al. | |
| 7,425,381 | B2 | 9/2008 | Gilman et al. | |
| 7,677,577 | B2 * | 3/2010 | Kanzaki | F16J 3/041 277/551 |
| 7,767,329 | B2 | 8/2010 | Crumm et al. | |
| 7,875,403 | B2 | 1/2011 | Finnerty | |
| 7,887,959 | B2 | 2/2011 | Gallet et al. | |
| 8,026,011 | B2 | 9/2011 | Ooshima et al. | |
| 8,043,760 | B2 | 10/2011 | Okamoto et al. | |
| 8,071,251 | B2 | 12/2011 | Eshraghi et al. | |
| 8,163,433 | B2 | 4/2012 | Zafred et al. | |
| 8,188,382 | B2 * | 5/2012 | Monden | E04G 15/061 174/505 |
| 8,197,976 | B2 | 6/2012 | Poshusta et al. | |
| 8,304,122 | B2 | 11/2012 | Poshusta et al. | |
| 8,343,684 | B2 | 1/2013 | Devoe et al. | |
| 8,389,180 | B2 | 3/2013 | Hawkes et al. | |
| 8,572,806 | B2 * | 11/2013 | Iwahara | F16L 5/10 16/2.1 |
| 8,614,023 | B2 | 12/2013 | Poshusta et al. | |
| 8,628,891 | B2 | 1/2014 | Brown et al. | |
| 8,652,707 | B2 | 2/2014 | Finnerty et al. | |
| 8,658,327 | B2 | 2/2014 | Mook et al. | |
| 8,714,563 | B2 * | 5/2014 | Yamamoto | F16J 15/025 277/549 |
| 8,715,879 | B2 | 5/2014 | Devoe et al. | |
| 9,500,116 | B2 * | 11/2016 | Foos | F16L 5/10 |
| 9,863,557 | B2 * | 1/2018 | Haynes | F16L 5/10 |
| 2003/0054215 | A1 | 3/2003 | Doshi et al. | |
| 2003/0062694 | A1 * | 4/2003 | Uchida | B60R 16/0222 277/634 |
| 2004/0195782 | A1 | 10/2004 | Bram et al. | |
| 2005/0055889 | A1 * | 3/2005 | Thaler | E04D 13/1476 52/58 |
| 2005/0217991 | A1 | 10/2005 | Dahlquist | |
| 2006/0127725 | A9 | 6/2006 | Sarkar et al. | |
| 2006/0213369 | A1 * | 9/2006 | Edlund | B01D 53/22 96/4 |
| 2006/0263655 | A1 | 11/2006 | Schaevitz et al. | |
| 2007/0037028 | A1 | 2/2007 | Chiang et al. | |
| 2007/0099065 | A1 | 5/2007 | Rawson et al. | |
| 2007/0148523 | A1 | 6/2007 | Brown et al. | |
| 2007/0196704 | A1 | 8/2007 | Valensa et al. | |
| 2007/0237998 | A1 | 10/2007 | Armstrong et al. | |
| 2008/0211226 | A1 * | 9/2008 | Whitney | F16L 5/10 285/46 |
| 2009/0044971 | A1 * | 2/2009 | Kataoka | H05K 3/244 174/257 |
| 2009/0050680 | A1 * | 2/2009 | Martin | B23K 1/0008 228/262.9 |
| 2010/0044971 | A1 * | 2/2010 | Henry | B65D 88/54 277/606 |
| 2010/0203399 | A1 | 8/2010 | Poshusta et al. | |
| 2012/0122007 | A1 | 5/2012 | Kuehn et al. | |
| 2012/0282538 | A1 | 11/2012 | Nakajima et al. | |
| 2013/0040216 | A1 | 2/2013 | Poshusta et al. | |
| 2013/0075980 | A1 * | 3/2013 | Yamamoto | F16J 15/025 277/591 |
| 2015/0004528 | A1 | 1/2015 | Palumbo et al. | |

OTHER PUBLICATIONS

Lessing, A review of sealing technologies applicable to solid oxide electrolysis cells, Journal of Materials Science, 2007, 3465-3476, vol. 42, No. 10.
International Search Report and Written Opinion in corresponding PCT Application: PCT/2014/042684, dated Nov. 5, 2014.
M.K. Mahapatra et al., "Glass-based seals for solid oxide fuel and electrolzyer cells—A review", Materials Science and Engineering R, 67 (2010) pp. 65-85.

* cited by examiner

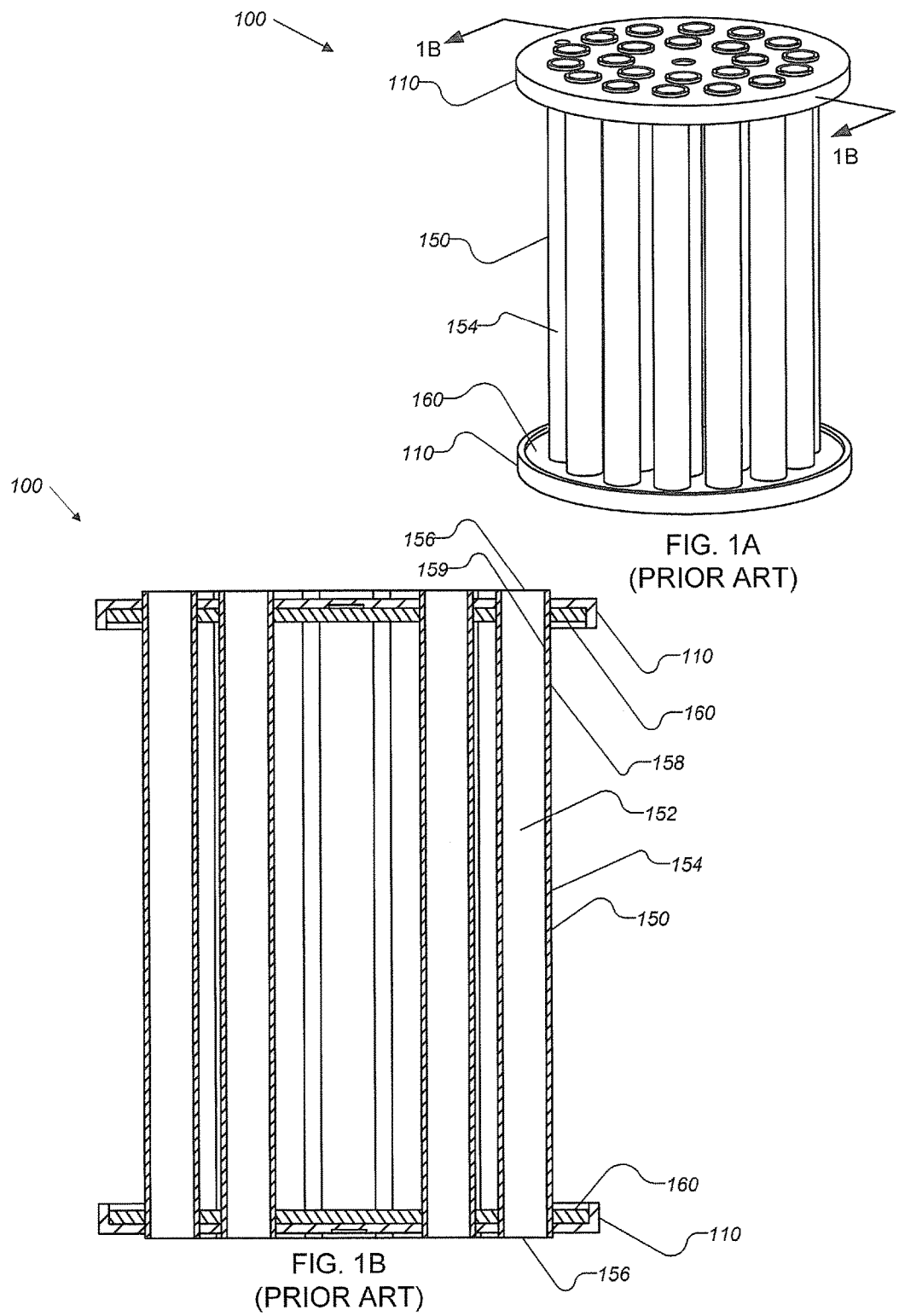

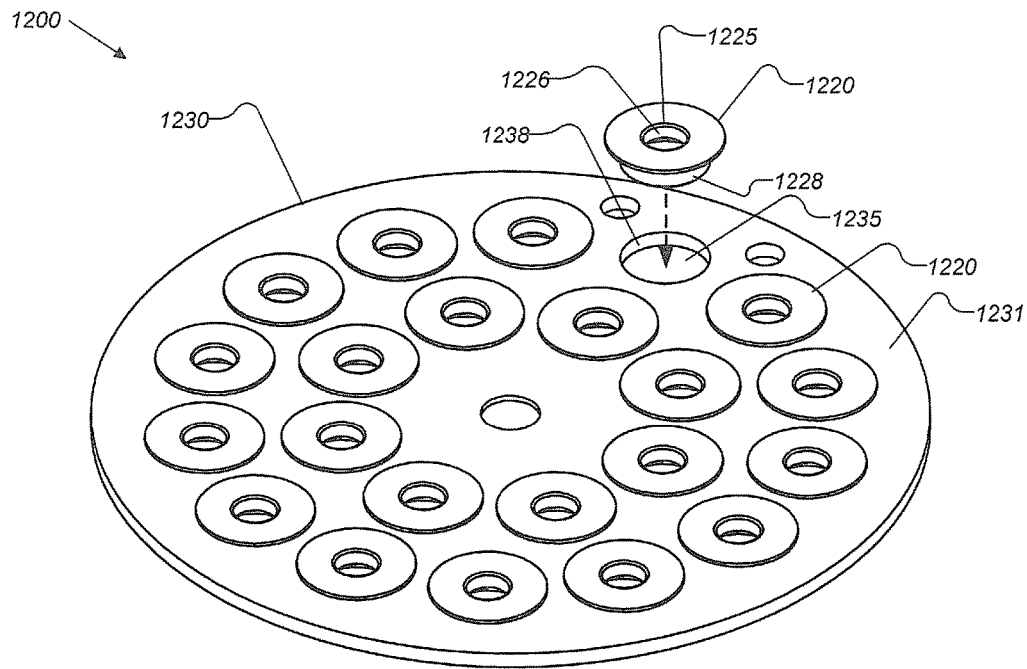
FIG.12A
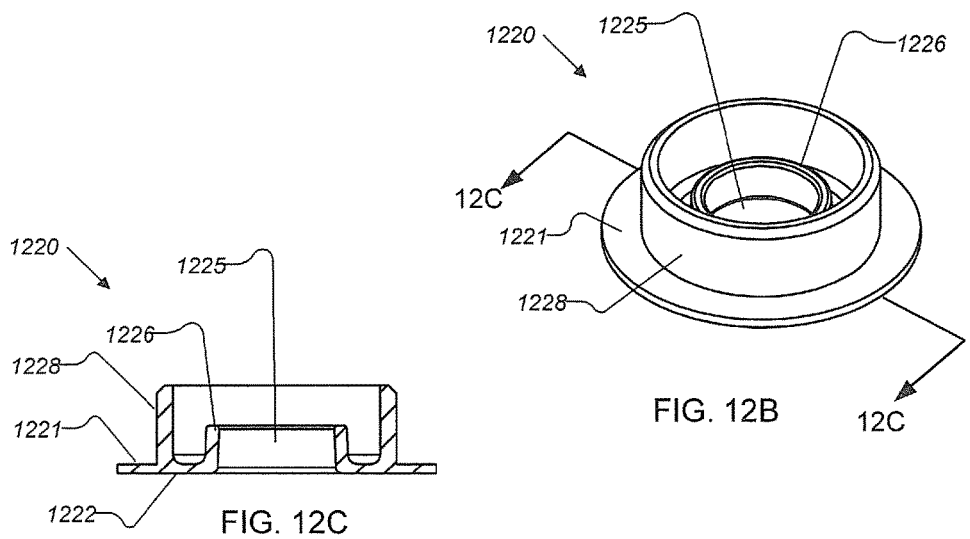
FIG. 12B
FIG. 12C

SOLID OXIDE FUEL CELL WITH FLEXIBLE FUEL ROD SUPPORT STRUCTURE

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2013 Protonex Technology Corporation.

2 BACKGROUND OF THE INVENTION

2.1 Field of the Invention

The exemplary, illustrative, technology herein relates to Solid Oxide Fuel Cell (SOFC) systems, methods, and methods of manufacturing. In particular the exemplary, illustrative technology relates to manufacturing and using solid oxide fuel cells.

2.2 The Related Art

Fuel cells are used to generate power by an electrochemical process. The components that generate power are commonly referred to as "cells." As the voltage for an individual cell may be relatively low, it is often necessary to connect a plurality of cells, either in parallel or in series, to provide power to a device having a desired operating voltage. Such an array of cells is generally referred to as a "stack" or "bundle."

Solid oxide fuel cells (SOFCs) are a particularly useful type of fuel cell because they can operate on an expanded list of fuels, which includes pure hydrogen but also includes hydrocarbon fuels such as propane, gasoline, diesel, kerosene (JP-8 military fuel), ethanol, and other bio-fuels. SOFCs use a ceramic electrolyte and generate current when oxygen ions cross the electrolyte. However, one drawback of SOFCs is the need to operate the fuel cell at high temperature (e.g. above 500° C.) to process the fuels. The high temperature operation leads to a variety of problems, including thermal creep and increased susceptibility to corrosion, which creates the need to select heat resistant materials (e.g. ceramics, Inconel, and other high temperature metal alloys) for such components as the fuel cell stacks, structural elements supporting the fuel cell stacks, and various gas seals.

Referring now to FIGS. 1A and 1B, an example conventional SOFC stack (100) comprises two cup shaped opposing end plates (110) with multiple electrolyte rods (150) supported between the opposing end plates. Each rod comprises a ceramic electrolyte, formed from nickel oxide or the like, and each rod acts as a single fuel cell in a fuel cell stack (100) that comprises a plurality of rods. Each rod (150) comprises a hollow conduit (152) surrounded by an outer wall (154) with the conduit having opposing open ends (156). Each conduit conveys a gas or vapor fuel from an input end to an output end. The exterior surface (158) of each rod is coated with a cathode material and the interior surface (159) of each rod is coated with an anode material. One example conventional SOFC device is disclosed in commonly assigned U.S. application Ser. No. 12/367,168 now U.S. Pat. No. 8,304,122 to Poshusta et al., filed on Feb. 6, 2009, entitled Solid oxide fuel cell system with hot zones having improved reactant distribution which is incorporated herein by reference in its entirety.

Fuel is simultaneously flowed through each of the hollow conduits (152) as an oxidant, (e.g. air or another oxidant) is flowed over the external surfaces (158) (e.g. by a fan, blower, natural convection, or the like).

Alternatively, conventional solid oxide fuel cells are made with a cathode coating on the interior of the cell (159) and an anode coating on the exterior of the cell (158). These cells operate with the oxidant flowing through the interior of the rods while fuel passes over the external surface.

In operation the rods electrochemically react with the fuel flowing over the anode (e.g. through the conduit) (152), and with the oxidant passed over the cathode (e.g., the outer surface of the rods) (158). The electrochemical reaction generates a current flow along longitudinal surfaces of each rod. Each of the rods is connected to an anode terminal at a first end and a cathode terminal at an opposing end (not shown) as required for delivering the current flow generated in each rod out of the fuel cell.

In some conventional SOFC systems, an electric heater or burner burning the same fuel being delivered to the rods is disposed to initially heat the rods from ambient temperature to an operating temperature range of 650-1000° C. in order to initiate the desired electrochemical reaction. Thereafter the heater or burner may not be required as the electrochemical reaction is exothermic and produces sufficient heat to activate and maintain subsequent reaction.

In a conventional SOFC system, the rods are captured between the opposing end plates (110) which support the rods in an operating position, such that the rods are oriented parallel to each other in a bundle. The end plates also serve as input and output manifolds functioning as end plates of a cylindrical cathode chamber can, which encloses a cylindrical volume between the end plates. Additionally a feed can (not shown) is disposed on an inlet side of rod stack wherein the input end plate acts as a manifold between the feed can and the cathode chamber to prevent fuel from entering the cathode chamber. In particular the input end plate directs fuel through the hollow portion of each rod where it reacts with anode materials disposed on internal surfaces (159) of the rods. Meanwhile oxidant flows through the cathode chamber rod where it reacts with cathode materials disposed on external surfaces (158) of the rods. Accordingly there is a need to seal the flow can at each rod/endplate interface to prevent oxidant from escaping the cathode can and to prevent fuel from entering the cathode can. The end plates (110) may also serve as conductors for conducting current from each fuel cell rod to appropriate electrical terminals (e.g. to power connected electrical loads). In particular opposing end plates (110) may comprise anode and cathode conductors respectively. Moreover, it is desirable to electrically connect the anodes and cathodes of each rod in series so there is a further need to electrically isolate rod external surfaces from rod internal surfaces at the interface between each rod end and the end plates. Accordingly there is a need to electrically isolate the rod/endplate interface to prevent electrical shorts between the rod anode and cathode surfaces.

One problem with conventional SOFC designs is that it is difficult to attach the ceramic rods (150) to the metal end plates (110) without gas leaks developing at the rod end plate interface after the system reaches a steady state operating temperature (e.g. between 650-1000° C.). This is because the metal end plates and the ceramic rods have different thermal expansion characteristics and thus expand at different rates with increasing temperature. This non-uniform thermal expansion leads to gaps developing at the interface between the rods and the end plates, causing gas leaks, especially after the system reaches its operating temperature.

Another problem with the rod-to-plate interface is that the materials tend to permanently deform over time as a result of thermal creep which can occur after prolonged high temperature operation even when the stresses involved are below the yield strength of the material. Thermal creep is especially severe in materials subjected to high temperature environments for long periods. Moreover the ceramic rods and metal end plates have different creep characteristics. In the example of the conventional rod end plate interface, the metal end plates (110) are more likely to become permanently deformed at operating temperatures than the ceramic rods because creep in the metal end plates occurs at a lower temperature than creep in the ceramic rods.

Another problem with conventional SOFC systems is that the high temperature operation leads to excessive oxidation of the metal end plates as a result of constant exposure to the oxidant. Over prolonged use, a buildup of oxidation degrades electrical conductivity across the end plates and may lead to further gas leaks.

The rod to end plate interface problem has been addressed in conventional SOFC fuel cells by potting the rods in place using a high temperature ceramic potting material such as Aremco's Ceramabond 552 and 668, or the like. More specifically each end plate (110) is formed cup-shaped with a circular base wall (111) and an annular side wall (112) extending toward the opposing end plate. Each base wall (111) includes a plurality of through holes (115) with each through hole sized to receive a rod end there through. Thus the rods (150) are installed through the base walls (111) with a slight protrusion at each end and the annual side wall height is about 0.1-0.2 inches. Conventionally the rod ends have a clearance fit with respect to holes passing through the end plates. The end plates with installed rod ends are filled with the liquid ceramic potting material (160) which is then cured. In another embodiment, each end plate may include a circular ceramic plate that fits over the outer diameter of each rod and mates with the annular side wall such that liquid ceramic potting material is poured between the end plate and circular ceramic plate and cured to create a seal. The cured potting material (160) seals any gaps between the rods and base wall and mechanically supports each rod in a desired operating position. Thus the potting material (160) overcomes the problems associated with expansion and creep in the metal end plates by sealing each end of the ceramic rods for a length of about 0.1 to 0.2 inches.

One problem with potting the rod in places is the cost of labor to pot the end plates and the cost of the potting material.

A second problem with potting the rods in place is that the cured potting material is very stiff and the rods, which are made from brittle, inflexible ceramic materials such as nickel oxide, can break or crack when the rod assembly is bent or twisted during insertion of the rod assembly into its housing. Any cracks in the rods will result in a fuel leak. Moreover due to the permanent attachment of the end plates to the rods by potting, even if only one rod cracks the entire rod assembly becomes unusable and must be replaced.

A third problem with potting the ends of each rod is that the potted ends do not participate in the electrochemical reaction which reduces the effective length of each rod. This leads to an overall lowering of current generating capacity of each rod of the rod assembly.

Therefore, there is a need for an SOFC end plate seal that ensures a strong and robust mechanical connection between the rod ends and the end plates and a mechanical connection that is less susceptible to rod damage due to bending or twisting forces applied to the rods during assembly and handling, Meanwhile there is still a need to reliably gas seal the rod end plate interface at operational temperatures (e.g. between 650-1000° C., for example at or around 750° C.), to prevent electrical shorts between anode and cathode surfaces and to provide good electrical terminal contact at each rod end to fully utilize current generated in each rod. There is a further need avoid gas leaks from occurring after prolonged use such as may be caused by dissimilar thermal creep associated with the metal end plates and the ceramic rod ends and or caused by excessive oxidation. Additionally, a desirable end plate seal reduces cost and may allow disassembly and reassembly of individual rods.

3 SUMMARY OF THE INVENTION

In view of the problems associated with conventional methods and apparatus set forth above it is an object of the present invention to provide an SOFC rod-end plate interface that is less susceptible to rod damage due to bending or twisting of the fuel cell stack. It is a further object of the invention to provide a rod-end plate interface that is less susceptible to developing gas leaks at operating temperatures of the SOFC. It is a still further object of the invention to provide a rod-end plate interface that is less susceptible to developing electrical shorts at operating temperatures of the SOFC system. It is also an object of the invention to provide a rod-end plate interface that electrically isolates anode rod surfaces from cathode rod surfaces at operating temperatures of the SOFC system. It is a further object of the invention to provide a rod-end plate interface with improved manufacturability and reliability and reduced cost. It is another object of the invention to provide an SOFC stack wherein rods may be removed to be cleaned, replaced, or reused.

The present inventors have found that a flexible end plate aperture configured to capture a rod ends at room temperature generates sufficient clamping force to hold the rod end in place without fuel leaks. The flexible end plate aperture holds the rod end with sufficient clamping force to overcome changes in clamping force caused by dissimilar coefficients of thermal expansion, and thermal creep associated with ceramic rods mated with metal end plates or other dissimilar materials. The flexible aperture of the present invention maintains leak-free clamping of the rod ends even when the rod assembly is substantially permanently operating at temperatures up to and above 600° C. and preferably between about 650 to 1000° C.

In one example a solid oxide fuel cell comprising a fuel rod assembly. The rod assembly includes a fuel rod formed with an outer wall enclosing a hollow longitudinal conduit. Both the outer rod and the conduit are preferable cylindrical. A cylindrical tube stub extends from each end of the outer wall and the hollow longitudinal conduit passes completely through the outer wall and each of the tube stubs.

The tube assembly includes a first end plate base wall for supporting one end of the rod and a second base plate wall for supporting the other end of the rod. Each base wall includes a through hole positioned to receive one of the tube stubs extending from each end of the rod. Each through holes includes a flexure element that engages with the tube stub. In one instance the flexure element is integral with the base wall. In another instance the flexure element is a flexure insert installed into the base wall through hole. In another instance the flexure element is formed on a flexure plate attached to the end plate base wall.

Each flexure element comprises a flexible portion surrounding a flexure through hole. Each flexure through hole receives an end stub therein. Each flexure through hole is surrounded by a flexible portion formed with a mechanical stiffness that is less than a mechanical stiffness of the rod and each of the end plate base walls and other non-flexible portions of the flexible element.

An outside diameter of each tube stub is engaged with the flexure through hole with an interference fit. The interference fit is sized to provide a mechanical retention force suitable for holding the fuel rod in place and maintaining a gas tight seal between the outside diameter of the tube stub and the inside diameter of the flexure or base wall through hole when the fuel rod assembly is operated at temperatures ranging from 500° C. to 1000° C.

In another example a method includes supporting a plurality of hollow fuel rods between a pair of opposing end plates. In this example each fuel cell rod includes a hollow tube stub extending from each end. The method includes associating a plurality of flexure elements with each end plate. The flexure elements are positioned to interface with rod stubs at locations where the rod stubs are to be supported. In particular each rod is supported between the two end plates with both of its rod stubs supported by a flexure element.

Each tube stub is engaged with a flexure element with an interference fit between the tube stub and a flexure through hole passing through the flexure element. The interference fit provides a mechanical retention force suitable for holding the fuel rod in place. Additionally the interference fit provides a gas tight seal between the tube stub and the flexure element even when the fuel rod assembly is operated at temperatures ranging from 500° C. to 1000° C.

These and other aspects and advantages will become apparent when the Description below is read in conjunction with the accompanying Drawings.

4 BRIEF DESCRIPTION OF THE DRAWINGS

The features of the present invention will best be understood from a detailed description of the invention and example embodiments thereof selected for the purposes of illustration and shown in the accompanying drawings in which:

FIG. 1A depicts an isometric view of an exemplary conventional SOFC rod assembly.

FIG. 1B is a cross sectional view of the exemplary conventional SOFC stack depicted in FIG. 1A.

FIG. 5A through 5D each depict a cross sectional view of exemplary end plate hole configurations that include annular flexure profile for receiving rod ends according to the present invention.

Figure 6:
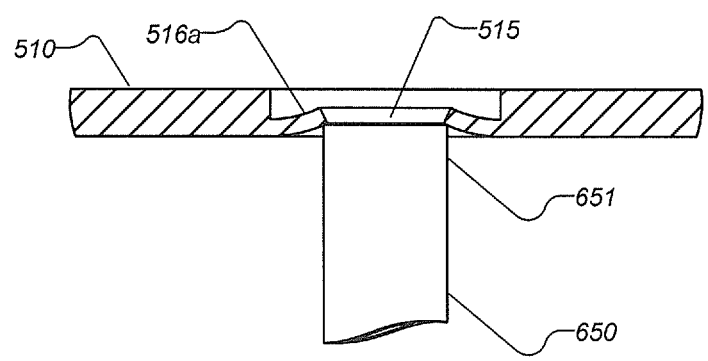

FIG. 6 depicts a side cross sectional view of a third exemplary rod end plate interface according to the present invention.

Figure 7A:
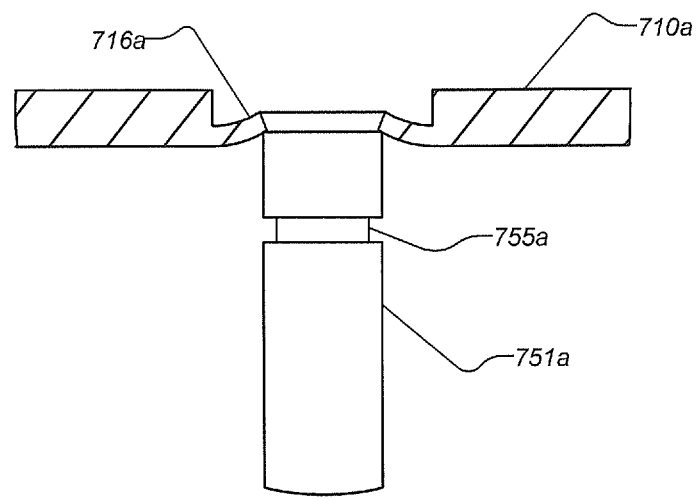

FIG. 7A depicts a side cross sectional view of a fourth exemplary rod end plate interface according to the present invention.

Figure 7B:
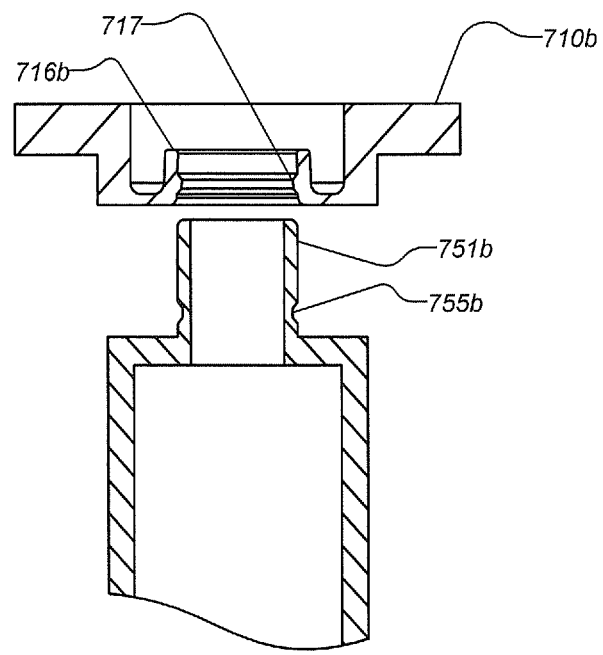

FIG. 7B depicts a side section view of an example two piece annular flexure and rod end configuration according to the present invention.

Figure 8A:
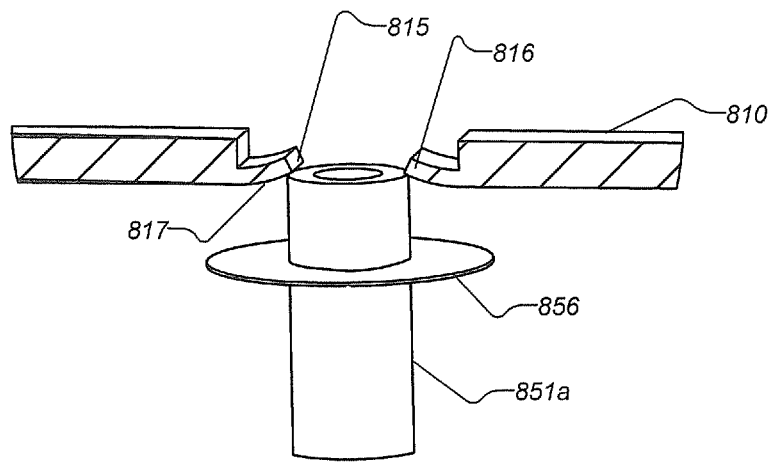

FIG. 8A depicts an isometric section view depicting a fifth exemplary rod end interface according to the present invention.

Figure 8B:
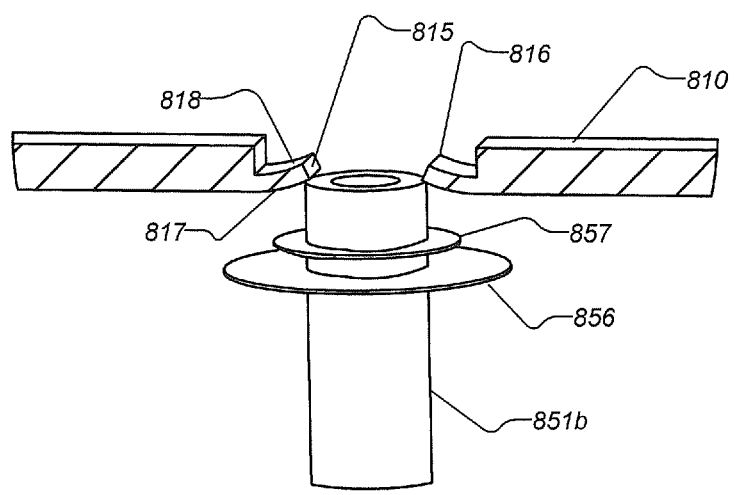

FIG. 8B depicts an isometric section view depicting a fifth exemplary rod end interface according to the present invention.

Figure 9A:
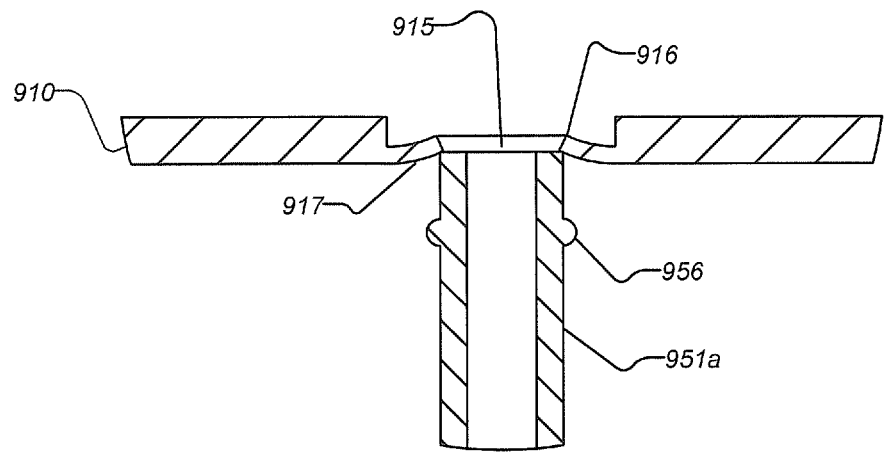

FIG. 9A depicts a front section view depicting a sixth exemplary rod end interface according to the present invention.

Figure 9B:
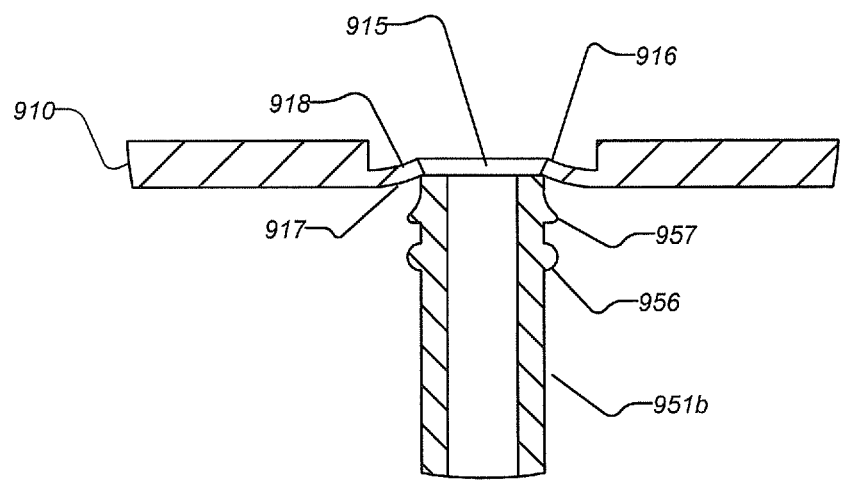

FIG. 9B depicts a front section view depicting a seventh exemplary rod end interface according to the present invention.

Figure 10A:
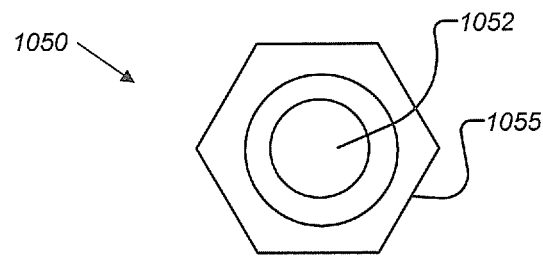

FIG. 10A is an axial view of an exemplary SOFC rod of the present invention

Figure 10B:
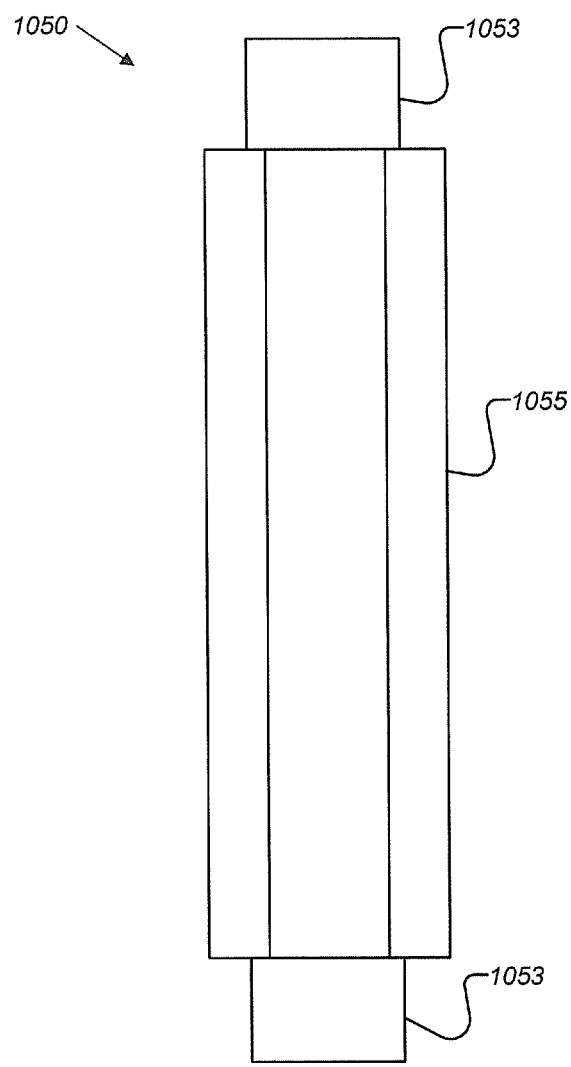

FIG. 10B is a side view of an exemplary SOFC rod of the present invention

Figure 11A:
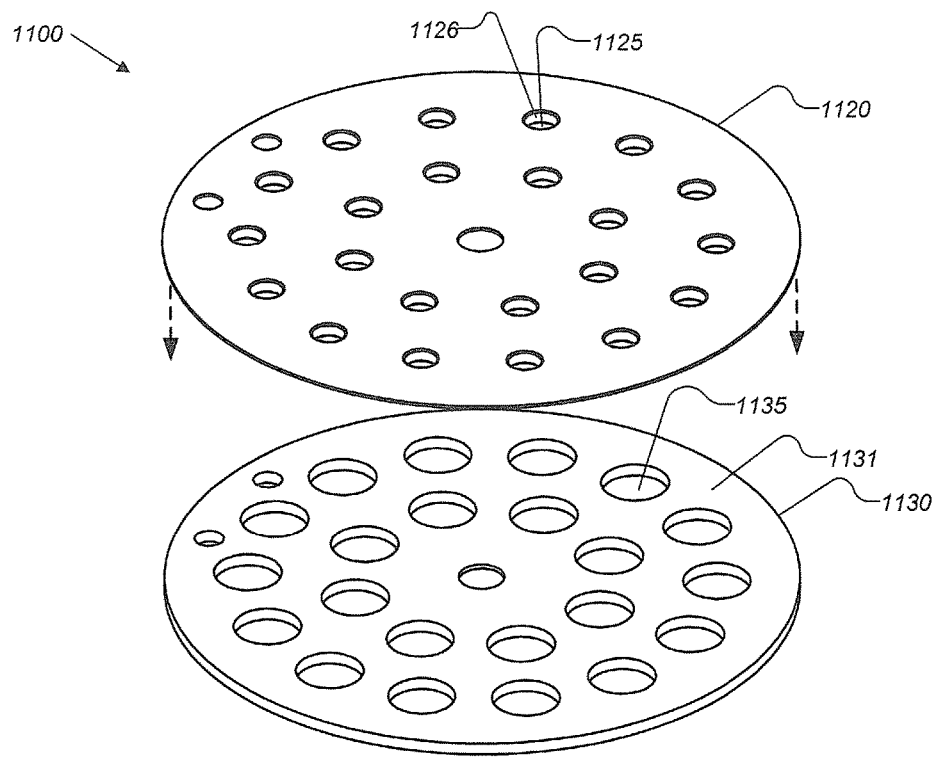
Figure 11B:
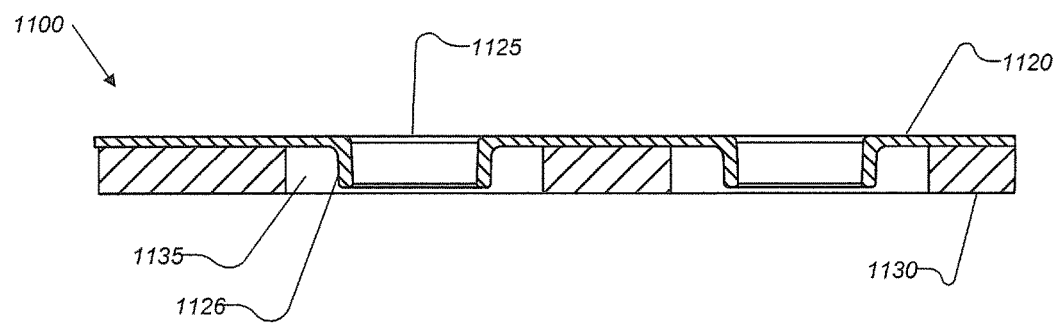

FIGS. 11A and 11B depict an exemplary embodiment of a two piece end plate according to the present invention.

FIGS. 12A, 12B, and 12C depict an exemplary embodiment of an endplate that includes an annular flexure associated rod end plate interface according to the present invention.

5 DESCRIPTION OF SOME EMBODIMENTS OF THE INVENTION

5.1 Overview

In an embodiment of the invention, an SOFC stack includes at least one end plate formed with a plurality of through holes passing there through for a receiving a rod end therein. In various embodiments each through hole is formed to include an annular flexure for receiving the rod end therein. The annular flexure provides a mechanical interface suitable for engaging with a rod end to mechanically secure the rod end to the end plate and to engage with the rod end with a gas/liquid tight seal.

In some non-limited example embodiments described below, each annular flexure associated with a through hole is formed integral with the end plate. In another non-limited example embodiment each end plate mates with a flexure plate which includes annular flexures aligned with though holes such that rod ends are received into the annular flexures formed by the flexure plate. In a further non-limited example embodiment, each through hole mates with a flexure insert formed to mate with the through hole and receive a rod end there through.

In each of the below described embodiments, rod ends are assembled into annular flexures by engaging the rod ends into a through hole of the annular flexure. Preferably in each embodiment, the annular flexure is configured to allow assembly of rod ends with annular flexures without heating either of the mating parts. Each annular flexure is configured to provide an interference fit between the rod end and the annular flexure. Moreover the interference fit elastically deforms the rod end and the annular flexure and the deformation generates a mechanical retention force that holds the rod in place while also creating a gas and liquid tight seal not only at ambient temperature but also at desired operating temperatures (e.g. ranging from 500° C. to 1000° C.). Thus the annular flexures of the present invention eliminate the need for potting of the rod ends, thereby reducing assembly labor, improving reliability, and allowing rod removal for cleaning and or replacement. Preferably the annular flexures of the present invention are configured with a tight enough interference fit that gas leaks associated with thermal creep are avoided even after extensive thermal cycling and extended periods at operating temperatures of the SOFC and is resistant to creep.

In a further embodiment of the invention, the SOFC stack includes two end plates, each including through holes for receiving rod ends and each formed with or interfaced with an annular flexure such that both ends of each rod are engaged with an annular flexure.

In another aspect of the invention, a method of assembling an SOFC stack includes assembling first rod ends of a plurality of fuel cell rods into through holes of a first end plate wherein each through hole is configured as an annular flexure such that, when a rod end is inserted into the annular flexure the annular flexure mechanically engages with the rod end in a manner that provides a liquid and gas tight seal.

In a further aspect of the invention, a method of assembling an SOFC stack includes assembling second ends of the plurality of fuel cell rods into through hole formed through a second end plate wherein each through hole is configured as an annular flexure and wherein, when the second rod end is inserted into the annular flexure the annular flexure mechanically engages with the second rod end in a manner that provides a gas and liquid tight seal.

In a still further aspect of the invention, each annular flexure is configured for disassembly from a rod end without causing undesirable damage to the rod end. Thus the present invention includes a method of assembling an SOFC stack and then disassembling the SOFC stack to remove one of more rods and, optionally replace the removed rods with other rods or the same rods (e.g. after cleaning). Preferably the annular flexure configurations of the present invention allow assembly and disassembly of rods without application or removal of a potting material, a sealing element, or an adhesive. Thus the SOFC stack of the present invention is configured so that rods may be replaced or reused and is configured so that rods may be removed, cleaned, and reinstalled.

In an embodiment of the invention, an SOFC stack is provided with rod end and annular flexure configurations formed to allow assembled rod ends and end plates to be held in place by clamping forces generated by the annular flexures, wherein the flexibility of the annular flexures enables bending and twisting of the assembly without breaking or cracking the rods. More specifically, rod ends and annular flexures of the present invention are configured to transfer mechanical stresses applied to the rods to the annular flexures such substantially all material deformation associated with the mechanical stress applied is transferred to the annular flexure in order to substantially avoid mechanical deformation of the rods.

5.2 Definitions

The following definitions are used throughout, unless specifically indicated otherwise:

| TERM | DEFINITION |
| --- | --- |
| Rod end | Portion of SOFC rod that is inserted into a through hole of an end plate. May comprise the end of a SOFC rod, an insulator that is part of the rod and is located at the rod end, and/or an insulator that is positioned over an end portion of a rod (e.g., over a tube stub). |

5.3 Item Number List

The following item numbers are used throughout, unless specifically indicated otherwise.

| # | DESCRIPTION |
| --- | --- |
| 100 | Prior art SOFC Stack |
| 110 | Prior art end plate |
| 111 | End plate base wall |
| 112 | End plate side wall |
| 115 | End plate through hole |
| 150 | SOFC electrolyte rod |
| 152 | Rod hollow conduit |
| 154 | Rod outer wall |
| 156 | Rod end |
| 158 | Rod exterior surface |
| 159 | Rod interior surface |
| 160 | Ceramic potting material |
| 200 | SOFC stack |
| 210 | End plate |
| 211 | End plate base wall |
| 212 | Annular region |
| 213 | Flexure boss |
| 214 | Annular top wall |
| 215 | End plate through hole |
| 220 | Annular flexure |
| 216 | Sleeve wall |
| 217 | Flexure taper start |
| 218 | Flexure taper engagement |
| 219 | Flexure taper end |
| 250 | SOFC rod |
| 251 | Rod end |
| 252 | Rod hollow cavity |
| 253 | Rod tube stub |
| 258 | Rod exterior surface |
| 259 | Rod interior surface |
| 260 | Insulator |
| 261 | Insulator leading edge |
| 510 | End plate |
| 515 | Through hole |
| 516a | Annular flexure |
| 516b | Annular flexure |
| 516c | Annular flexure |
| 516d | Annular flexure |
| 650 | SOFC Rod |
| 651 | SOFC rod end |
| 710a | End plate |
| 710b | End plate |
| 716a | Annular flexure |
| 716b | Annular flexure |
| 717 | Annular flexure mating feature |
| 751a | Rod end |
| 751b | Rod end |
| 755a | Recessed capture ring |
| 755b | Recessed capture ring |
| 810 | End plate |
| 815 | Through hole |
| 816 | Annular flexure |
| 817 | End plate bottom surface |
| 818 | Flexure top surface |
| 851a | Rod end |
| 851b | Rod end |
| 856 | First mating surface feature |
| 857 | Second mating surface feature |
| 910 | End plate |
| 915 | Through hole |
| 916 | Annular flexure |
| 917 | Flexure bottom surface |

-continued

| # | DESCRIPTION |
|---|---|
| 918 | Flexure top surface |
| 951a | Rod end |
| 951b | Rod end |
| 956 | First mating protrusion |
| 957 | Second mating protrusion |
| 1050 | SOFC rod |
| 1052 | Hollow conduit |
| 1053 | Tube stub |
| 1055 | Rod main body |
| 1100 | Two component end plate |
| 1120 | Flexure plate |
| 1125 | Flexure plate through hole |
| 1126 | Annular flexure |
| 1130 | Backing plate |
| 1131 | Backing plate body |
| 1135 | Backing plate through hole |
| 1200 | Flexure insert end plate |
| 1220 | Flexure insert |
| 1222 | Top annular wall |
| 1225 | End plate through hole |
| 1226 | Sleeve wall |
| 1235 | Backing plate through hole |
| 1221 | Top annular wall surface |
| 1228 | Flexure sidewall mating feature |
| 1230 | Backing plate |
| 1231 | Backing plate surface |
| 1235 | Backing plate through hole |
| 1238 | Through hole side wall |

5.4 Exemplary System Architecture

Figure 1C:
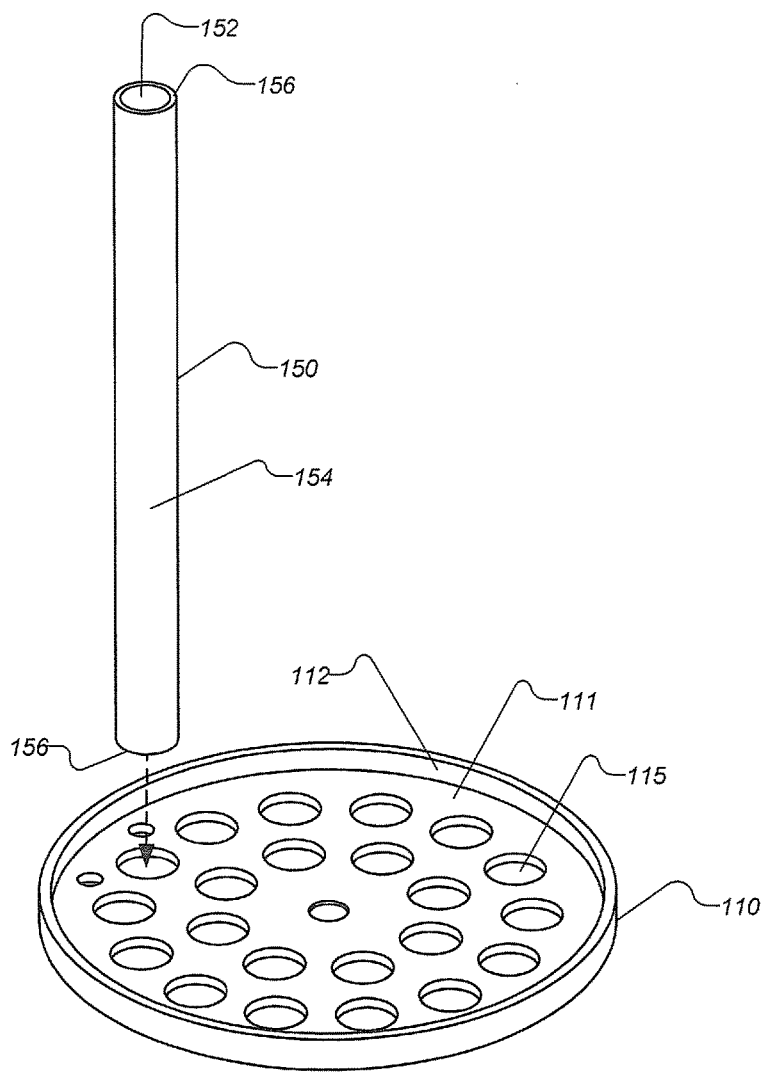
FIG. 1C depicts an exploded isometric view of an exemplary conventional SOFC stack end plate and rod.
Figure 2:
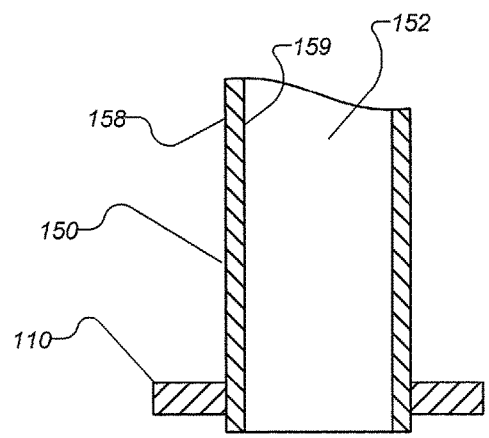
FIG. 2 is a cross sectional view of an exemplary conventional rod end plate interface.
Figure 3A:
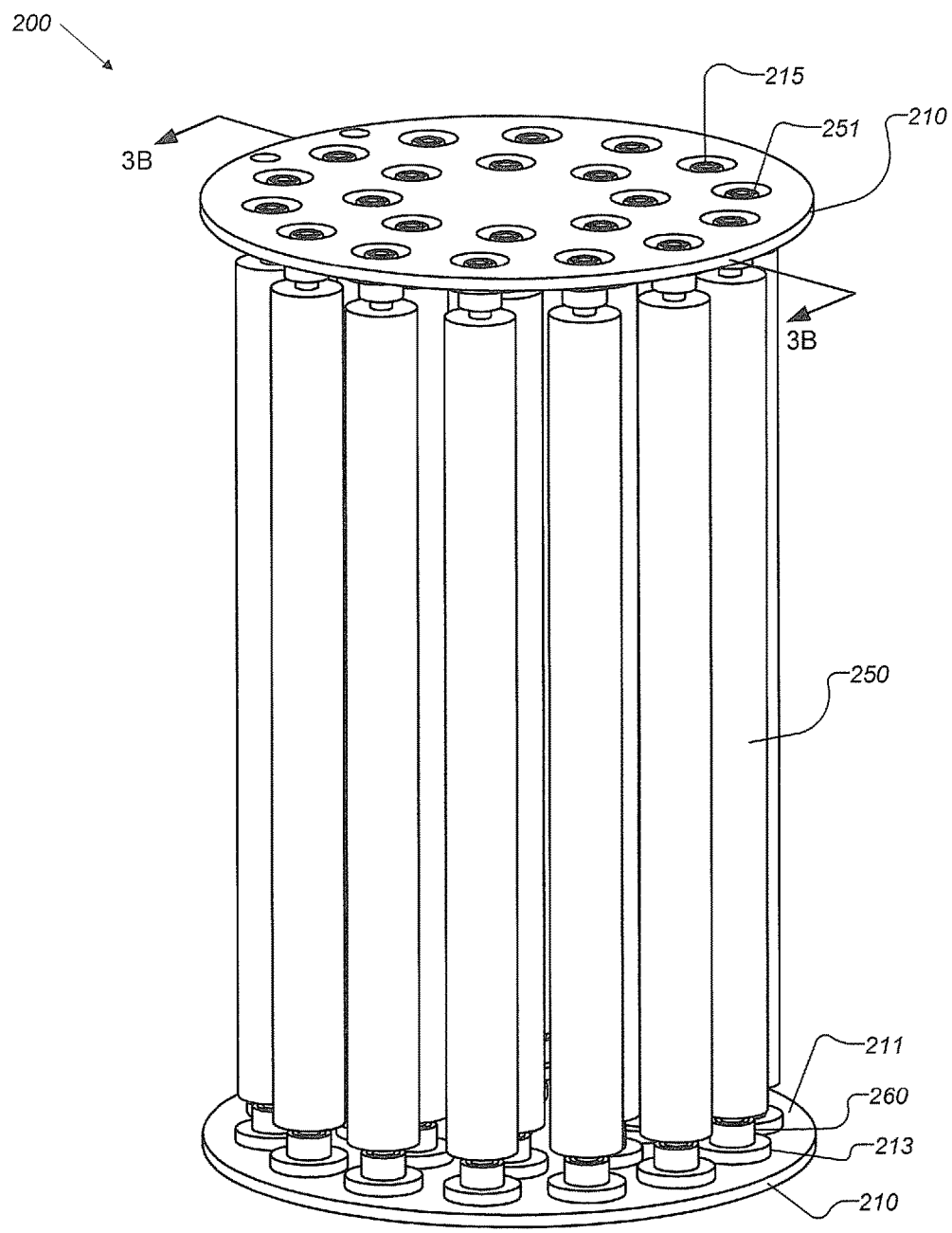
FIG. 3A depicts an isometric side front view of an exemplary rod assembly according to the present invention.
Figure 3B:
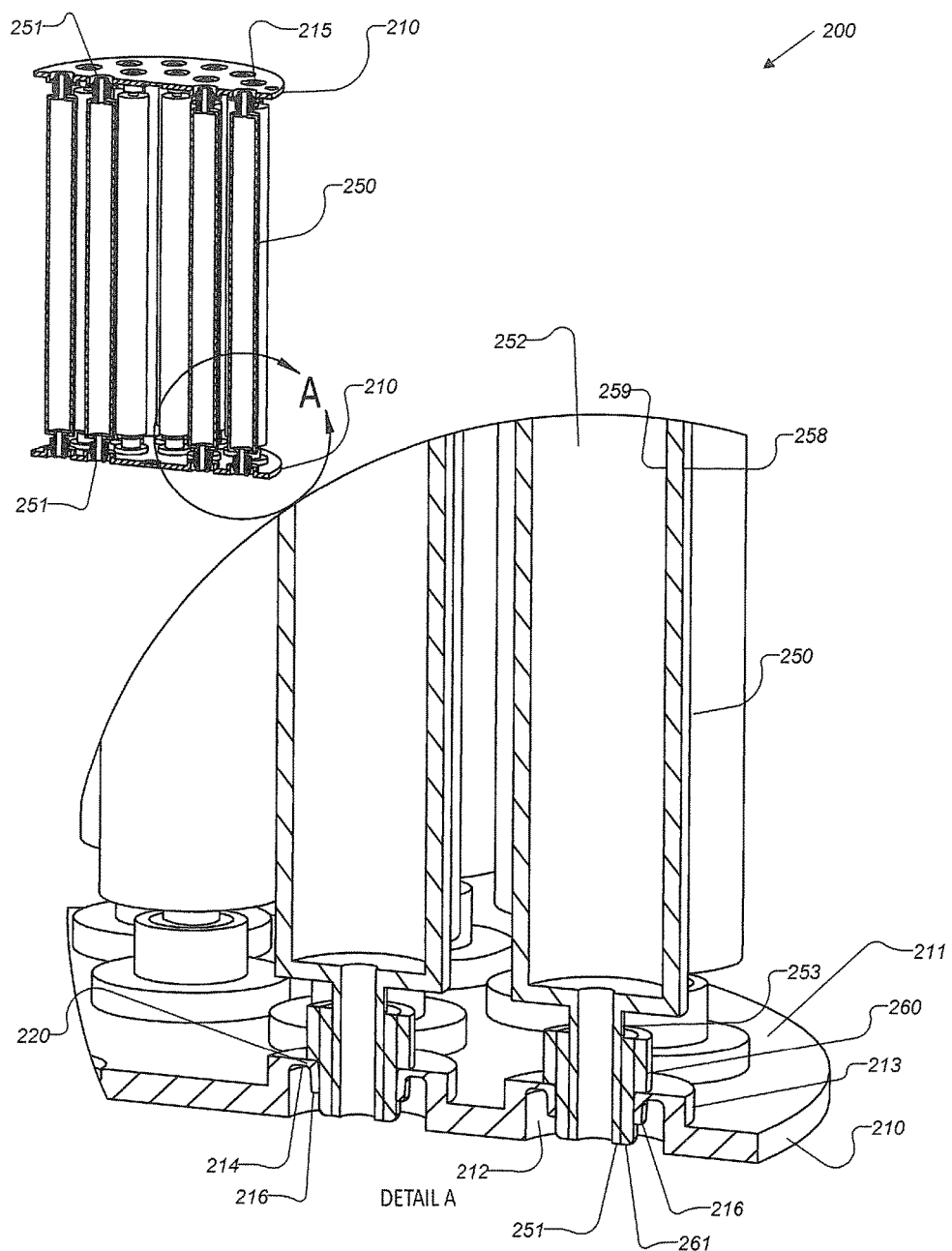
FIG. 3B depicts an isometric cross sectional detail view of an exemplary rod assembly and an exploded isometric cross sectional detail view or a first exemplary end plate rod interface according to the present invention.
Figure 3C:
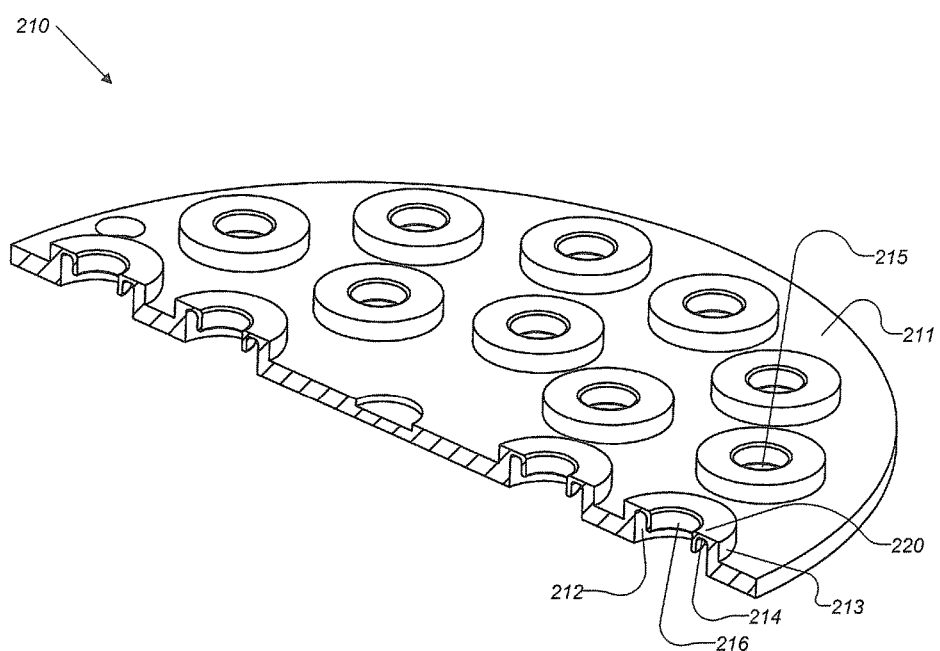
FIG. 3C depicts an isometric cross sectional view of an exemplary end plate formed according to the present invention.
Figure 4:
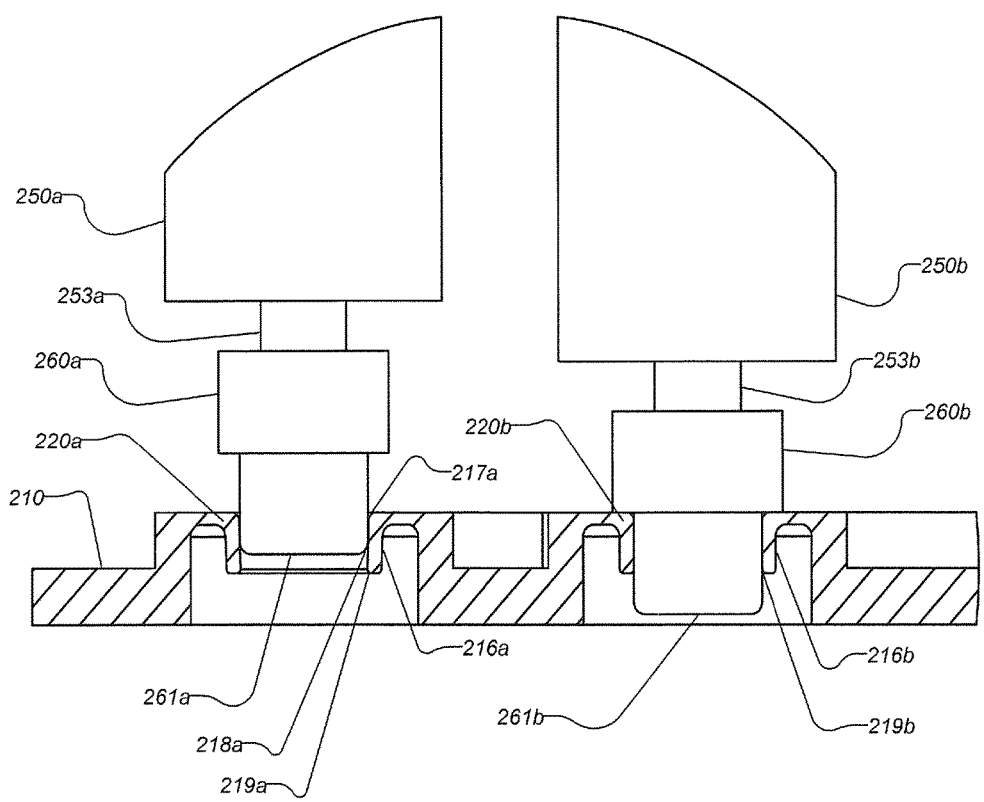
FIG. 4 depicts a cutaway sectional view of a second exemplary rod end plate interface according to the present invention.
Figure 5A:
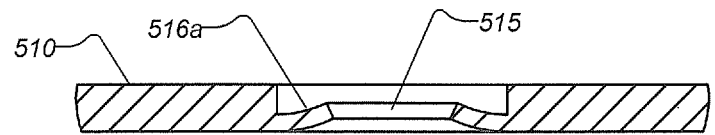
Figure 5B:
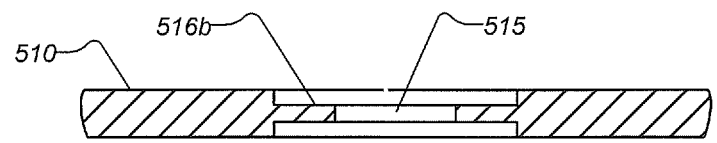
Figure 5C:
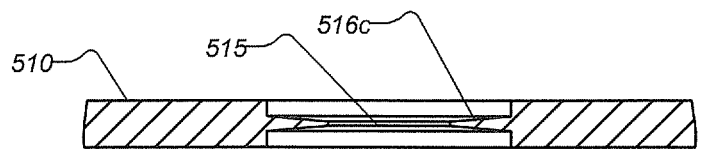
Figure 5D:
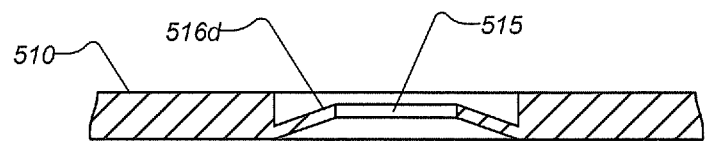

Referring now to FIGS. 3A-4 a first non-limiting example embodiment of the present invention comprises an SOFC stack (200) that includes a pair of opposing disk shaped end plates (210) each including a plurality of through holes (215) positioned to receive an SOFC rod end (251) there through wherein each through hole is associated with an annular flexure described below. Each end plate comprises a disk shaped base wall (211) comprising a material having low susceptibility to oxidation and other heat catalyzed chemical reactions while also possessing suitable elastic deformation and stiffness characteristics to perform as an annular flexure while also providing low thermal creep at SOFC operating temperatures. Preferably the end plates comprise a chromium free high temperature alloy wherein the lack of chromium avoids the potential of poisoning the cathode. In the present example embodiment a nickel-copper alloy is especially preferred, which in one example comprises a minimum of 63% nickel, 28-34% copper, a maximum of 2.5% iron, and a maximum of 2% manganese and has a linear coefficient of thermal expansion of 13.9 microns per meter per Kelvin.

Each of the end plate through holes (215) extends through the end plate and includes an annular flexure (220) surrounding the through hole. In the present embodiment (200) the annular flexure is integrally formed with the end plate as show in FIGS. 3B and 3C. The annular flexure (220) includes a flexure boss (213) comprising an annular wall extending substantially orthogonally from the end plate base wall (211), an annular top wall (214) extending from the flexure boss and substantially parallel with the end plate base wall (211) wherein the annular top wall (214) comprises a flexible portion having a low mechanical stiffness as compared with the mechanical stiffness of the end plate base wall (211) and compared with the rods (250a, 250b) so the flexible portion (214) elastically deforms in response to any bending or twisting forces imparted to the rods or the end plate base wall to prevent permanent deformation or breakage of the rods. In addition the annular flexure (220) includes a sleeve wall (216) extending substantially orthogonally from the annular top wall (214).

The sleeve wall (216) bounds the end plate through hole (215) and engages with the rod end. In particular the sleeve wall and the rod ends are configured to provide an interference fit between the rod end outside diameter and the inside diameter of the sleeve wall (216). Preferably the inside diameter of the sleeve wall (216) is tapered from a larger diameter at the end where it receives the rod end to a smaller diameter at the end where the rod end is engaged with the sleeve wall at a desired engagement length. In particular the sleeve wall has an initial diameter that is larger than the outer diameter of the rod end for receiving the rod end therein and is tapered to a smaller diameter that is smaller than the outer diameter of the rod end for capturing the rod end therein. Alternately or additionally the rod end diameter may be tapered to provide a clearance fit at one end where the rod end is inserted into the sleeve wall (216) and an interference fit at the other end when the rod end is engaged with the sleeve wall to a desired engagement depth.

In either case the sleeve wall (216) is configured to be flexed or substantially deflected by the rod end during assembly. Meanwhile the sleeve wall material resists the deformation and responds by maintaining a clamping spring force against the exterior surface of the rod end. At operating temperature the metal end plate expands more than the ceramic rod or ceramic insulator due to the dissimilar thermal expansion coefficients of the mating materials. However according to an important aspect of the present invention the sleeve wall (216) is configured to continue to apply its clamping spring force against the exterior surface of the rod end with sufficient force as required to securely hold the rod end in place and to maintain liquid/gas sealing between the rod end and the sleeve wall (216a) over the entire operating temperature range of the fuel cell. Additionally, at operating temperature the metal end plate and annular flexure may permanently deform more due to thermal creep than the ceramic rod end or ceramic insulator assembled at the rod end due to the dissimilar thermal creep characteristics of the mating materials. However according to an important aspect of the present invention the sleeve wall (216) is configured to continue to apply its clamping spring force against the exterior surface of the rod end with sufficient force as required to securely hold the rod end in place and to maintain liquid/gas sealing between the rod end and the sleeve wall (216) over the entire operating temperature range of the fuel cell even when thermal creep tends to permanently deform the mating materials.

The sleeve wall (216) is configured to be flexed radially outward from the center of the through hole (215), to allow deformation of the sleeve wall along the depth of the through hole (215) as the rod end (251) is engaged. The sleeve wall (216) is further configured to provide a radially inward engaging force in response to the rod end being inserted into the through hole (215) to a desired engagement length. The inward engaging force is sufficient to capture the rod end with a clamping force that is maintained even after prolonged exposure to a temperature ranging from 500-1000° C. The clamping force generated by the sleeve wall (216) is sufficient to prevent liquids and gases from passing between the rod end and the through hole (215). Moreover according to an aspect of the present invention, the clamping force provided by the deformation of the sleeve wall (216) is sufficient to maintain a liquid/gas seal substantially indefinitely at the operating temperature range of the SOFC stack.

In one example embodiment, the gas seal is maintained at an operating temperature range is 650 to 1000° C. Other embodiments may be configured to operate at temperatures greater than or less than this range without deviating from the present invention.

Each of the rods (250) comprises a tube wall having an inner wall surface (259) and an outer wall surface (258). The inner wall surface (259) bounds a hollow cavity or conduit (252) that longitudinally penetrates through the entire rod from end to end. The interior surface (259) of the rods (250) includes an anode region, such as may be formed by coating internal surfaces of the rod with an anode material layer that is exposed to fuels passing through the hollow cavity. The exterior surface (258) of the rods includes a cathode region, such as may be formed by coating internal surfaces of the rod with a cathode material layer that is exposed to an oxidant flowing across the exterior surface. In some embodiments the cathode and anode regions comprise substantially the entire internal and external rod surfaces respectively. In further embodiments SOFC rods are configured with a cathode region on the interior surface of the rod and an anode region on the exterior of the rod. The interior of these rods is exposed to an oxidant while the exterior is exposed to fuel. The annular flexures (220) of the present invention provide a gas a liquid tight seal and retention force to rod ends irrespective of whether the rod comprises and internal or external anode surface. The annular flexures of the invention are also useful for SOFCs that include rods with anode and cathode surface area coverage that includes less than the entire rod length.

The rods (250) themselves are made of a material with low thermal expansion, such as a metal ceramic blend. In an embodiment rods are made from a nickel oxide ceramic, which has a linear coefficient of thermal expansion of 9 to 12 microns per meter per Kelvin at 25° C. Any ceramic with a low thermal expansion that does not adversely chemically react with the fuel or oxidant is sufficient for use in the rods. In the present example embodiment, rods (250) are substantially cylindrical tubes with an outer diameter of 10 mm, a 1 mm wall thickness, and a 120 mm length. In the present example embodiment, rod ends (251) comprise tube stubs (253) that have a smaller diameter than the main body of the rods (250), for example having outer rod stud diameter of 3 mm with a main body rod outer diameter of 10 mm.

In the first example embodiment each rod end interfaces with an electrical insulator (260) assembled with the tube stub (253) so that when assembled, the electrical insulator (260) positioned between the tube stub and the annular flexure (220), comprise the rod end that is inserted into the annular flexure as illustrated in FIG. 3-4. The term rod end, as used throughout this specification, means a tube stub (253) that is inserted directly into a through hole (215) of an end plate or a tube stub assembled that includes an electrical insulator surrounding the tube stud wherein an outside diameter of the electrical insulator is inserted into the through hole (215) of an end plate.

Insulator (260) serves to prevent an electrical connection between surfaces of the rod (250) and the metal end plate (210). Thus in the present example embodiment, the internal diameter of the end plate through hole (215) and the external diameter of the electrical insulator (260) are sized to provide an interference fit as described above. The sleeve wall (216), which surrounds the end plate through hole thus provides the radially inward engaging clamping force that engages the rod end in response to the electrical insulator surrounding the rod end being inserted into the through hole such that the electrical insulator (260) is captured by the sleeve wall (216).

a. The electrical insulator (260) may be formed using any material that is electrically insulating and that is capable of withstanding the operating temperatures of the fuel cell. In the present example embodiment, insulators are made from non-conductive ceramic material such as high temperature ceramic insulator material comprising alumina, zirconia, and/or silica. In other non-limiting example embodiments, the electrical insulators are made from electrically insulating high temperature glass. In the present example embodiment, insulator (260) has an outer diameter of 0.182 inches and an inner diameter of approximately 3 mm, sized to fit tube stub (253). In a further embodiment, a tube stub (253) is made from an electrically insulating ceramic material and integrally formed with the rod. In an example of such an embodiment, the outer diameter of the tube stub is 0.182 inches.

In the present example embodiment, illustrated in FIG. 3B, an insulator distal end (261) is assembled flush with tube stub distal end (251). In other non-limiting example embodiments, a portion of rod end (251) protrudes from the insulator (260) to expose surfaces of the tube stub (253) below the insulator and the end plate to provide a terminal end for attaching an electrical connector to the rod tube stub (253).

Referring now to FIG. 4, a side section view shows the insertion of rod end tube stubs (253a, 253b) formed with electrical insulators (260a, 260b) into annual flexures (220a, 220b) to illustrate the deformation of the sleeve wall (216a) and generation of clamping force in the present example embodiment. In this embodiment, each tube stub (253a, 253b) is surrounded by an insulator (260a, 260b). Insulators (260a, 260b) comprise insulating ceramic material and function to electrically insulate each rod (250a, 250b) from the metal plate (210). The insulators may be attached to the tube stubs (253) by brazing, potting with liquid ceramic material, by interference fit, or by other suitable attaching process. In other embodiments, the rod tube stub comprises an electrical insulator (260) otherwise formed as a portion of rod (250).

A first fuel rod or tube (250a) is shown partially assembled into the end plate through hole formed by the sleeve wall (216a). In this embodiment, the sleeve wall (216a) is formed with a tapered through hole diameter wherein at the beginning of the taper (217a) the inner diameter of the sleeve wall is oversized relative to the outer diameter of the insulator (260a). When assembled so that the outer diameter of the insulator is concentric with inner diameter of the sleeve wall, the outer surface of the insulator proximate to the leading edge of the insulator (261a) makes contact with the inner surface of the sleeve wall at engagement (218a) that is approximately half-way along the sleeve wall length. At engagement (218a) the inner diameter of the sleeve wall (216a) is approximately equal to the outer diameter of the insulator (260a) or rod end. At the end of the taper (219a), the inner diameter of the sleeve wall (216a) in a non-deformed, as built, state is undersized relative to the outer diameter of the insulator (260a). In a particular embodiment the sleeve wall (216a) is manufactured with 0.005 inch interference fit at the end (219a) of the flexure, relative to the outer diameter of the insulator (260) or rod tube stub, as the case may be.

A second fuel rod or tube (250b) is shown fully assembled into sleeve wall (216b). The assembly of rod (250b) into sleeve wall (216b) has deformed the flexure so that the inner diameter of the flexure tapered end (219b) is defined by the outer diameter of the insulator (216b). When fully assembled into sleeve wall (216b), the leading edge (261b) of insulator (260b) protrudes from the end (219b) of the sleeve wall so that it may be contacted by an electrical connector. The portion of the sleeve wall (216a) that was built with an inner diameter undersized relative to the outer diameter of the insulator (260a) has been deformed by the insertion of the insulator (260a) (or tube stub end) into the through hole (215). This portion of the sleeve wall (216b) has been flexed or elastically deformed to an inner diameter substantially equal to the outer diameter of the insulator. This deformation of the sleeve wall (216a) is sufficient to create a clamping force on the insulator or tube stub end without annealing the flexure material (e.g. without heating the end plate to inset the rod as is sometimes done to assemble interference fit assemblies). The clamping force creates a liquid and gas tight seal and the interference fit is maintained with thermal expansion and contraction of the mating materials as the material are cycled to operating temperature and subsequently cooled. In some embodiments, a portion of tube stub (253) protrudes from insulator (260), extending beyond insulator leading edge (261) for interfacing with an electrical connector. It is further noted that the thickness, engagement length, surface finish, interference fit dimensions and material composition of the sleeve wall (216a) are each variables that can be adjusted to modify the clamping force provided by engagement with a rod end and that each of the these parameters may be changeable without deviating from the present invention.

In a further aspect of the present invention the annular top wall (214) comprises a flexible portion surrounding the through hole which is flexed or elastically deformed when bending or twisting forces acting on the SOFC rods (250) are transferred to the annular top wall (214). In particular the top annular wall (214) is formed with a small material thickness as compared to the material thickness of the end plate base wall (211) such that the annular top wall (214) or flexible portion is less mechanically stiff that the end plate base wall which is has a thicker base wall (211). Preferably the annular top wall (214) is also less stiff than the rod ends or the SOFC rods such that forces acting on the rods or the end cap base plate tend to flex or elastically deform the annular top wall (214) rather than deform the brittle rods or rod ends. In particular the present invention includes a low stiffness annular flexible region surrounding each of the end plate through holes (215) for electrically deforming in response to bending or twisting forces imparted to the SOFC rods while the rod are being assembled to the end plate and while the end plates are being assembled as a fuel cell.

The low stiffness annular region is formed by reducing the thickness of the end plate base wall (211) proximate to each through hole (215) to reduce the stiffness of the end plate surrounding each through hole. The material thickness may be reduced by machining material thickness from one or both sides of the end plate and in particular in the patterns shown in FIGS. 3C, 4, and 5-9). On one non-limiting example the annular top wall (214) and the sleeve wall (216a) are formed with 25-50% less material thickness than the end plate base wall. It is further noted that at least the thickness, area and material composition of the annular flexure are each variables that can be adjusted to modify the mechanical stiffness of the annular flexure and that any of these parameters may be changeable without deviating from the present invention.

In the present exemplary, non-limiting embodiment, the annular flexures and corresponding through holes are machined into the end plates which are formed from a nickel-copper alloy. In a preferred embodiment, the end plate base wall (211) has a thickness of approximately 0.068 inches. Each through hole (215) is surrounded by a circular flexure boss (213) extending from a top surface of the plate (210) and with an overall plate thickness of the base wall (210) plus the flexure boss of approximately 0.140 inches at the boss (213). The sleeve wall (216) and the annular top wall (214) are formed by reducing wall thicknesses by machining. In a preferred embodiment each of the sleeve wall (216) and the annular top wall (214) has a material thickness of approximately 0.02 inches. In alternative embodiments the plate and flexure dimensions are adjusted based on design parameters such as, for example, operating temperatures, designed clamping force, and tube or insulator material properties, as will be readily understood by a person having skill in the art.

In additional embodiments annular flexures are formed in end plates that are not round. In an exemplary embodiment, one or more rows of through holes are formed in a plate that is formed with a rectangular shape. At least one of the through holes, and in some embodiments all of the through holes, are each surrounded by an annular flexure. In an embodiment, a plate is configured with a single through hole, surrounded by an annular flexure.

In further embodiments, end plate (210) may be formed from material other than a nickel-copper alloy. For example, an alternative high temperature, low chromium alloy may be used. In an embodiment, end plate (210) is formed from iconel material. The thickness of the end plates and thickness of the flexure, as well as other dimensions such as taper of the flexure, may be changed in alternate embodiments to accommodate the properties of alternative material. For example, a flexure is formed with a reduced thickness when end plate material is stiffer than a nickel-copper alloy.

Manufacturing processes other than machining may be used to form the end plates. For example, end plates and end plate features may be formed by one or more processes, or a combination of processes, such as casting, machining, EDM, laser cutting, stamping, forming, etc.

In further example embodiments shown in FIGS. 5A, 5B, 5C, and 5D the end plate (510) comprises a plurality of end plate holes (515) positioned to receive rod end stubs therein. Each end plate through hole (515) is surrounded by flexible region which is the present example is an annular flexure (516a-d) formed in the end plate (510) by removing metal from one or both sides of the end plate (510) in an annular pattern surrounding the through hole. The reduced material thickness of the annular pattern reduces the mechanical stiffness of the annular pattern as compared to the mechanical stiffness of the surrounding end plate. In particular this allows the reduced thickness material of the annular flexure to flex or substantially elastically deform in response to forces acting on the annular flexure. Moreover by proper selection of the flexure material and flexure material thickness the flexure material can be caused to flex or elastically deform in response to typical assembly forces imparted to the rod ends or end plates without plastically or permanently deforming the annular flexure or either of the rods or the end plates.

Each of the annular flexures (516) surrounds a through hole (515) for installing a rod end there through. The through hole (515) is configured to have an effective inner diameter that is undersized relative to the outer diameter of the rod end to be installed there through. As shown in FIG. 6, rod (650) is installed in end plate (510) which includes annular flexure (516a) having reduced material thickness as compared to the surrounding end plate. When a rod end (e.g., 651) is inserted into through hole (515) the annular flexure (516*a*) flexes or elastically deforms in response to the rod end insertion forces, deforming to an extent that allows the rod end to be inserted into the through hole. Deformation of the flexure provides clamping force on the rod end and creates a gas and liquid tight seal between the flexure and rod end. Moreover the diameter of the through hole (515) and the rod end are sized to allow insertion without heating either part in order to avoid annealing the flexure material which would tend to alter the material spring constant, possibly preventing good seal and or clamping. Similarly any of flexures (516*b*, 516*c*, or 516*d*) operate in substantially the same manner.

In addition to providing the clamping force, the annular flexures of the present invention flex or elastically deform in response to bending or twisting forces applied to the rods (e.g. rods 250) or transferred to the rods by forces acting on the entire rod assembly (e.g. 200). Thus the annular flexures of the present invention tend to prevent rod damage during assembly or disassembly of the fuel cell rod assembly by transferring bending and twisting forces from the rods to the annular flexures. In particular according to the present invention the annular flexure is less mechanically stiff than either the rods or the end plates specifically to transfer any forces that tend to bend or twist the rods or the rod assembly to annular flexures. Moreover forces applied to or transferred to the rod ends are transferred to the annular flexures which flex or elastically deform in response to the transferred forces. This is in contrast with conventional rod assemblies, which tend not to transfer bending or twisting forces applied to the rods or the rod assembly to a flexible element, thereby allowing the bending or twisting forces applied to the rods to act on the rod with resulting cracking and or breaking of the rods.

According to a further aspect of the present invention each rod ends are removable from annular flexures. In this case a longitudinal force is applied to a rod that tends to pull the rod end out of engagement with the annular flexure. The longitudinal force flexes or elastically deforms the annular flexure in response to the rod end insertion forces, deforming the annular flexure to an extent that allows the rod end to be pulled out of engagement. Thereafter another rod end or the same rod end can be reinserted into the flexure without causing undesirable damage to the flexure or the rod such that any one of or all of the rods can be disassembled from each end plate and the end plate and or the rods can be reused to build another rod assembly.

In another example embodiment shown in FIGS. 7A and 7B, each rod end (751*a*, 751*b*) is formed with a recessed capture ring (755*a*, 755*b*) provided to engage with the annular flexure (716*a*, 716*b*) of end plate (710*a*, 710*b*) when the rod end is installed. Annular flexure (716*b*) includes a mating feature (717) that mates with recessed capture ring (755*b*) when rod end (751*b*) is installed. The capture ring (755*a*, 755*b*) is machined or formed in the rod ends and conveniently defines an engagement length of the rod ends. The annular flexure (716*b*) is further formed with a mating feature (717) formed inside the end plate through hole for engaging with the rod end mating feature (755*b*) and defining an engagement length of rod end (751*b*). Additionally the engaged features (717) and (755*b*) provide a partial labyrinth seal or tortuous path that improves the gas and liquid tight seal formed by the annular flexure surface (717).

In embodiments shown in FIGS. 8A and 8B, each rod end (851*a*, 851*b*) includes one or more mating surface features (856, 857) having an outer diameter larger than the outer diameter of the rod end. As depicted in FIG. 8A, rod end (851*a*) includes a mating surface feature (856) configured to contact a first surface (817) of end plate (810) when rod end (851*a*) is installed. The contact of mating surface (856) with plate surface (817) defines an engagement length of the rod end as well as provides a partial labyrinth seal tortuous path that improves the gas and liquid tight seal formed by the flexure surface (817).

As depicted in FIG. 8B, rod end (851*b*) includes first mating surface (856) configured to mate with surface (817) of end plate (810) and additionally include second mating surface (857). The second mating surface (857) is configured to pass through the circular through hole (815) that is surrounded by annular flexure (816). When rod end (851*b*) is installed, second mating surface (857) is positioned in contact with top surface (818) of flexure (816) while first mating surface (856) is in contact with end plate surface (817). Second mating surface (857) and first mating surface (856) further define engagement length of rod end (851*b*). Mating surface (857) is further configured to provide a partial labyrinth seal tortuous path that improves the gas and liquid tight seal formed by the flexure surface (818). In further embodiments either one or both mating surfaces (856, 857) plastically or elastically deform when rod end (851*a*, 851*b*) is assembled with flexure (816), wherein the deformed mating surface conforms to the shape of flexure (816). In each case the surface feature (856, 857) may comprise an electrical insulating material that improves electrical isolation of the rod end from the end plate. In each case the surface feature (856, 857) may be integrally formed on the rod end stub on the electrical insulator attached to the rod end stub or separately attached to the rod end stub.

In embodiments shown in FIGS. 9A and 9B, each rod end (951*a*, 951*b*) includes one or more annular mating protrusions (956, 957). As illustrated in FIG. 9A, rod end (951*a*) includes mating protrusion (956) which is configured to contact a bottom surface (917) of flexure (916) when rod end (910*a*) is assembled into through hole (915) that is surrounded by flexure (916). Mating protrusion (956) defines an engagement depth of rod end (951*a*) and provides a partial labyrinth seal tortuous path that improves the gas and liquid tight seal formed by the flexure surface (917). As shown in FIG. 9B, rod end (951*b*) includes first mating protrusion (956) that, when rod end (951*b*) and flexure (916) are assembled, contacts with first surface (917). Rod end (951*b*) further includes second mating protrusion (957) that passes through flexure (916) and mates with second surface (918) when the rod end (951*b*) and flexure (916) are assembled. Second mating protrusion (957) further defines engagement length of rod end (951*b*) and provides a partial labyrinth seal tortuous path that improves the gas and liquid tight seal when installed in contact with flexure (916) and flexure surfaces (918, 917).

In each of the above described embodiments, the rod outside diameter provided to engage with the end plate through hole is larger than the end plate through hole diameter of the annular flexure provided to receive the rod end stub therein and in the case of the capture ring the base diameter of the capture ring is larger than the inside diameter of the annular flexure. The rod end is inserted into the annular flexure by applying a longitudinal force to the rod directed to insert the rod end through the inside diameter of the annular flexure. The longitudinal force is sufficient to bend or flex the annular flexure sufficiently to allow engagement with the rod end. The depth of engagement may be defined by a depth gauge tool or by engagement with a capture ring (e.g., 755*a*, 755*b*) or other locating features (e.g., 856, 857, 956, or 957).

In still further fuel cell designs the SOFC tube stack (e.g., 200) includes an inlet tube sheet and an outlet tube sheet, which are end plates at an inlet end of the fuel cell rods and at an outlet end of the fuel cell rods. In such an embodiment, a gas tight seal is required at the inlet end of the fuel cell stack to prevent the mixing of fuel and oxidant. However, a gas tight seal may not be required at the outlet end of the stack, downstream of which the inlet fuel and oxidant streams mix in an exhaust chamber adjacent to and downstream of the outlet tube sheet. In an embodiment, the inlet tube sheet includes annular flexures to tightly engage one end (i.e., the inlet end) of each rod while the outlet rod ends are more loosely mounted at the outlet tube sheet where a gas seal is not required. In such an embodiment, the inlet tube sheet includes annular flexures while the outlet tube sheet may include through holes slightly oversized relative to the fuel cell rods to allow for ease of assembly and to allow for expansion and contraction of tube sheet and fuel cell rod materials. In this example embodiment each rod is substantially supported by single annular flexure engaged with one end of the rod. In further embodiments the outlet tube sheet rod ends are held in place with annular flexures that provide reduces clamping force relative to the clamping force provided by the flexures at the inlet tube sheet.

Referring to FIGS. 10A and 10B, an alternative rod (1050) according to the present invention comprises a hollow cavity or conduit (1052) that longitudinally penetrates through the entire rod from end to end and a rod main body (1055) with hexagonal cross section for the majority of the rod length and rod end tube stubs (1053) with circular cross sections, configured to fit into annular flexures on end plates of the invention. In a particular embodiment a rod is formed with a polyhedral cross section and the rod ends or tube stubs are formed with a circular cross sectional shape. In still further embodiments, rod ends or tube stubs are formed with polyhedral cross sections and annular flexures are formed with polyhedral shape designed flex and form a gas and liquid tight seal when the rod ends are assembled into the flexures. Rods of the invention include rods with internal cavities formed with various lumens, including round and non-round rods with two or more cavities or hollow passages extending longitudinally along the length of the rod.

As shown in FIGS. 11A and 11B, an alternative embodiment of an end plate that includes annular flexures surrounding through holes comprises a two plate assembly (1100). In particular, a backing plate (1130) and a flexure plate (1120) are assembled together to form a composite end plate (1100). Backing plate (1130) comprises a relatively stiff disk shaped plate body (1131) formed with backing plate through holes (1135) passing there through at locations corresponding to rod end positions. Flexure plate (1120) comprises a relative less stiff disk shaped plate body (1120) formed with flexure plate through holes (1125) passing there through sized to receive rod ends therein and with an annular flexures (1126) surrounding each flexure plate through hole (1125). The flexure plate (1120) is mated with the backing plate (1130) to form a composite support plate (1100) wherein the annular flexures (1126) of the flexure plate are concentrically aligned with and positioned within the backing plate through holes (1135) of the backing plate (1130). The two plates are bonded together, for example by mechanical fasteners, brazing, welding, or other joining process suitable for the high temperature in-use environment of the plate.

The backing plate (1130) and the flexure plate (1120) are each made from a high temperature, low chromium alloy material such as a nickel-copper alloy. In a further embodiment flexure plate (1120) is made from a nickel-copper alloy and the backing plate (1130) is made from another material such as a different high temperature, low chromium alloy or a ceramic material. The backing plate (1130) may be formed using a first machining process while the flexure plate (1120) is formed using a second machining process. For example, the backing plate (1130) is formed by drilling, machining, or laser cutting through holes in a plate while the flexure plate (1120) is formed using a stamping process. Other machining processes may be used for the backing plate, the flexure plate, or both. In operation rod ends engage with the through holes (1125) and are held by the annular flexures (1126) as described above.

In a further embodiment, illustrated in FIGS. 12A, 12B, and 12C, an end plate (1200) that includes annular flexures surrounding through holes comprises a backing plate (1230) with multiple backing plate through holes (1235) passing there through at locations corresponding to rod end positions and flexure inserts (1220) installed in each of the backing plate through holes (1235). Each of the flexure inserts (1220) includes a flexure plate through hole (1225) passing there through sized to receive rod ends therein surrounded by an annular sleeve wall (1226). Each flexure insert (1220) comprises a top annular wall (1222) comprising a flexible portion. Top annular wall (1222) includes a surface (1221) that mates with backing plate surface (1231) to prevent the flexure insert from passing through backing plate holes (1235). The sidewall (1228) extending from the top annular wall (1222) has an outside diameter sized to install into backing plate through hole (1235) with an interface fit that is maintained at operating temperatures of the rod assembly. Alternately flexure inserts may be bonded or brazed in place. A sleeve wall (1226) extends from top annular wall (1222) to receive the rod end therein and engage the rod end with a clamping force as described above. In addition the top annular wall (1222) is formed with a material thickness corresponding with a desired elastic deformation or flexure amplitude to prevent tube damage when bending and twisting forces experienced by the rods are transferred to the annular flexure.

The individual flexure inserts (1220) may be produced using high volume production method and then assembled into through holes (1235) on a backing plate (1230), which may be produced by a different manufacturing method. In an embodiment flexure inserts (1220) are bonded to the backing plate (1230) by, for example, brazing. In another embodiment flexure inserts are press fit into through holes of the backing plate. The backing plate may be made from the same material as the flexure inserts or may be made from a different material. In an embodiment both the flexure inserts and the backing plate are made using a nickel-copper alloy material to provide a matched coefficient of thermal expansion. In a further embodiment the flexure inserts are made from a nickel-copper alloy while the backing plate is made from a different material, such as a different high temperature, low chromium alloy. In a still further embodiment, the backing plate is made from a ceramic material, for example an electrically insulating ceramic material, such as a alumina/zirconia/silica ceramic insulator high temp material while the inserts are made from a high temperature metal alloy such as a nickel-copper alloy. In such an embodiment the ceramic backing plate electrically isolates each fuel cell rod and separate ceramic insulators for each rod are not required. In a further embodiment flexure inserts (1220) are bonded to a backing plate (1230) with an electrically insulating material disposed between the inserts and the backing plates. For example, flexure inserts (1220) are potted in through holes (1235) of backing plate (1230) with electrically insulating potting material disposed between each of the mating surfaces (1228, 1221) of the inserts and mating surfaces (1238, 1231) of the backing plate.

The present invention is usable with any suitable fuel for an SOFC. The fuel can be hydrogen, ethanol, light hydrocarbon fuels—such as methane, ethane, propane, butane, pentane, or hexane—or the fuel can be heavier hydrocarbons—such as gasoline, diesel fuel, kerosene, JP-8 military fuel, jet fuel, or biofuels. Kerosene is a preferred fuel.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. within a solid oxide fuel cell comprising an SOFC stack with a cylindrical shape) those skilled in the art will recognize that its usefulness is not limited thereto and that the present invention can be beneficially used in any number of environments and implementations where it is desirable to mount tubes without potting material, and in general to provide a flexible mounting arrangement for tubes and especially tubes made of a brittle material such as a ceramic material. Moreover the present invention provides an alternative to gas seals usable in a high temperature environment. Accordingly, the claims set forth below should be construed in view of the full breadth and spirit of the invention as disclosed herein.

What is claimed:

1. A solid oxide fuel cell comprising a fuel rod assembly comprising:
   a fuel rod comprising an outer wall enclosing a hollow longitudinal conduit;
   a cylindrical tube stub extending from each end of the outer wall wherein the hollow longitudinal conduit passes completely through the outer wall and through each of the tube stubs and wherein each of the tube stubs has an outside diameter;
   a first end plate base wall formed with a base wall through hole positioned to receive a first tube stub there through;
   a second end plate base wall formed with the base wall through hole positioned to receive a second tube stub there through;
   a first flexure element assembled to the first end plate base wall;
   wherein the first flexure element comprises an annular flexure boss extending from the respective end plate base wall towards the other end plate base wall, a top wall extending directly from the annular flexure boss, a sleeve wall extending substantially orthogonally from the top wall, a flexure through hole formed by an inside surface of the sleeve wall, wherein the top wall has a mechanical stiffness that is less than a mechanical stiffness of the fuel rod and less than a mechanical stiffness of the end plate base walls;
   wherein the outside diameter of the first tube stub is engaged with the flexure through hole of the first flexure element.

2. The solid oxide fuel cell of claim 1, wherein the first flexure element is formed with an outside diameter of the annular flexure boss sized to install into the base wall through hole of the first end plate base wall with an interference fit and the outside diameter of the first tube stub is engaged with the flexure through hole of the first flexure element.

3. The solid oxide fuel cell of claim 1, further comprising:
   an anode material coated on an inside surface of the longitudinal conduit;
   a cathode material coated on an outside surface of the outer wall;
   wherein the anode material reacts with a fuel flowing through the longitudinal conduit and the cathode material reacts with an oxidant flowing over the outside wall and wherein the anode and cathode reactions generate an electrical current extractable from the fuel rod.

4. The solid oxide fuel cell of claim 1, further comprising:
   a cathode material coated on an inside surface of the longitudinal conduit;
   an anode material coated on an outside surface of the outer wall;
   wherein the cathode material reacts with an oxidant flowing through the longitudinal conduit and the anode material reacts with a fuel flowing over the outside wall and wherein the anode and cathode reactions generate an electrical current extractable from the fuel rod.

5. The solid oxide fuel cell of claim 1, wherein each of the first end plate base wall, the second end plate base wall, and the first flexure element comprises the same high temperature, low chromium metal alloy material.

6. The solid oxide fuel cell fuel rod assembly of claim 5, wherein each of the first base wall, the second end plate base wall and the first flexure element is formed from a nickel-copper alloy.

7. The solid oxide fuel cell of claim 6 wherein nickel-copper alloy includes a minimum of 63% nickel, 28-34% copper, a maximum of 2.5% iron, and a maximum of 2% manganese and has a linear coefficient of thermal expansion of 13.9 microns per meter per Kelvin.

8. The solid oxide fuel cell of claim 1, wherein the fuel rod comprises a ceramic electrolyte.

9. The solid oxide fuel cell of claim 1, wherein the annular flexure boss, the top wall and the sleeve wall form a U-shape in cross-section.

10. The solid oxide fuel cell of claim 1, wherein the annular flexure boss, the top wall and the sleeve wall form a J-shape in cross-section.

11. A solid oxide fuel cell fuel rod assembly, comprising:
    a plurality of fuel rods each comprising an outer wall enclosing a hollow longitudinal conduit and a cylindrical tube stub extending from each end of the outer wall wherein the hollow longitudinal conduit passes completely through the outer wall and through each of the tube stubs and wherein each of the tube stubs has an outside diameter;
    a first end plate base wall formed from a plurality of base wall through holes positioned to receive a first tube stub of one of the plurality of fuel rods there through;
    a second end plate base wall formed with a plurality of base wall through holes positioned to receive a second tube stub of one of the plurality of fuel rods there through;
    a first flexure element assembled to the first end plate base wall about each of the plurality of base wall through holes of the first end plate base wall;
    wherein the first flexure element comprises a flexure boss extending from the respective end plate base wall, a top wall extending directly from the flexure boss, a sleeve wall extending substantially orthogonally from the top wall, a flexure through hole formed by an inside surface of the sleeve wall, wherein the top wall has a mechanical stiffness that is less than a mechanical stiffness of the fuel rod and less than a mechanical stiffness of each of the first and second end plate base walls;

wherein the outside diameter of the first tube stub is engaged with the flexure through hole of the first flexure element.

12. A solid oxide fuel cell, comprising:
an end plate forming a hole;
an elongated fuel rod assembly having a first end extending into the hole; and
a flexure assembly for coupling the first end to the end plate, the flexure assembly including:
   a flexure boss extending from the end plate around the hole along an axis of the elongated fuel rod assembly;
   a top wall extending directly from the flexure boss perpendicular to the axis;
   a sleeve wall extending from the top wall concentric with the flexure boss, the sleeve wall forming a bore coupled to the first end,
   wherein the top wall has a mechanical stiffness that is less than a mechanical stiffness of the fuel rod assembly and less than a mechanical stiffness of the end plate.

13. The solid oxide fuel cell as recited in claim 12, wherein the flexure assembly is integral with the end plate and the bore is sized to capture the first end in an interference fit.

14. The solid oxide fuel cell as recited in claim 12, wherein the flexure boss and the sleeve wall are annular.

15. The solid oxide fuel cell as recited in claim 12, wherein the flexure boss is formed as a flexure insert sized and configured to couple to the hole by at least one of bonding or brazing or an interference fit.

16. The solid oxide fuel cell as recited in claim 15, wherein the flexure insert further includes a top annular outer wall extending from and surrounding the flexure boss, forming a surface that mates with the end plate to prevent the flexure assembly from passing through the hole.

17. The solid oxide fuel cell as recited in claim 12, wherein the first end is a tube stub.

18. The solid oxide fuel cell as recited in claim 12, wherein the flexure boss, the top wall and the sleeve wall form a U-shape in cross-section.

19. The solid oxide fuel cell as recited in claim 12, wherein the flexure boss, the top wall and the sleeve wall form a J-shape in cross-section.

20. The solid oxide fuel cell of claim 12, wherein the top wall and the sleeve wall are formed with 25-50% less material thickness than the end plate.

21. A solid oxide fuel cell comprising a fuel rod assembly comprising:
   a fuel rod comprising an outer wall enclosing a hollow longitudinal conduit;
   a cylindrical tube stub extending from each end of the outer wall wherein the hollow longitudinal conduit passes completely through the outer wall and through each of the tube stubs and wherein each of the tube stubs has an outside diameter;
   a first end plate base wall formed with a base wall through hole positioned to receive a first tube stub there through;
   a second end plate base wall formed with the base wall through hole positioned to receive a second tube stub there through;
   a first flexure element assembled to the first end plate base wall;
   wherein the first flexure element flexure element comprises an annular flexure boss extending from the respective end plate base wall towards the other end plate base wall, a top wall extending directly from the annular flexure boss, a sleeve wall extending substantially orthogonally from the top wall, a flexure through hole formed by an inside surface of the sleeve wall,
   wherein the top wall forms an annular flexure extending between the flexure boss and the sleeve wall,
   wherein the top wall has a mechanical stiffness that is less than a mechanical stiffness of the fuel rod and less than a mechanical stiffness of each of the first and second end plate base walls;
   wherein the outside diameter of the tube stub is engaged with the flexure through hole of a corresponding one of the first flexure elements.

22. A solid oxide fuel cell, comprising:
an end plate forming a hole;
an elongated fuel rod assembly having a first end extending into the hole; and
a flexure assembly for coupling the first end to the end plate, the flexure assembly including a unibody flexure boss extending from the end plate around the hole along an axis of the elongated fuel rod assembly, the unibody flexure boss having a top wall extending perpendicular to the axis and a sleeve wall extending from the top wall concentric with the flexure boss, the sleeve wall forming a bore coupled to the first end, wherein the top wall has a mechanical stiffness that is less than a mechanical stiffness of the fuel rod assembly and less than a mechanical stiffness of the end plate.

* * * * *